(12) United States Patent
Tanaka et al.

(10) Patent No.: US 11,298,619 B2
(45) Date of Patent: *Apr. 12, 2022

(54) INFORMATION PROCESSING PROGRAM, INFORMATION PROCESSING DEVICE, INFORMATION PROCESSING SYSTEM, AND INFORMATION PROCESSING METHOD

(71) Applicant: NINTENDO CO., LTD., Kyoto (JP)

(72) Inventors: Wataru Tanaka, Kyoto (JP); Kenta Motokura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,226

(22) Filed: Sep. 28, 2020

(65) Prior Publication Data

US 2021/0008452 A1 Jan. 14, 2021

Related U.S. Application Data

(63) Continuation of application No. 15/942,739, filed on Apr. 2, 2018, now Pat. No. 10,821,362.

(30) Foreign Application Priority Data

May 23, 2017 (JP) .............................. JP2017-101665

(51) Int. Cl.
*A63F 13/00* (2014.01)
*A63F 13/56* (2014.01)
(Continued)

(52) U.S. Cl.
CPC ............ *A63F 13/56* (2014.09); *A63F 13/422* (2014.09); *A63F 13/52* (2014.09); *A63F 13/577* (2014.09);
(Continued)

(58) Field of Classification Search
CPC .. A63F 13/10; A63F 13/06; A63F 2300/6045; A63F 2300/64;
(Continued)

(56) References Cited

U.S. PATENT DOCUMENTS

2005/0124401 A1 6/2005 Izuno
2006/0094502 A1 5/2006 Katayama
(Continued)

FOREIGN PATENT DOCUMENTS

CN 102 693 362 9/2012
EP 1 830 322 9/2007
(Continued)

OTHER PUBLICATIONS

Nintendo Official Guidebook: The Legend of Zelda: A Link Between Worlds dated Dec. 31, 2013 (with English translation), 26 pages.
(Continued)

*Primary Examiner* — Justin L Myhr
(74) *Attorney, Agent, or Firm* — Nixon & Vanderhye, PC

(57) ABSTRACT

An information processing system for controlling movements of a character (200) in a virtual three-dimensional space, comprising movement control unit (231) that controls the movements of the character (200), and a switching determination unit (232) that determines switching of the movement of the character (200) by the movement control unit (231) between a three-dimensional movement in the virtual three-dimensional space and a movement in a predetermined surface (211) provided in the virtual three-dimensional space. The movement control unit (231) determines a speed of the character (200) after the switching on the basis of a speed of the character (200) before the switching when the switching is performed between the
(Continued)

three-dimensional movement in the virtual three-dimensional space and the movement in the predetermined surface (211).

17 Claims, 20 Drawing Sheets

(51) Int. Cl.
 A63F 13/422 (2014.01)
 A63F 13/577 (2014.01)
 A63F 13/52 (2014.01)
 G06T 13/20 (2011.01)
 A63F 13/58 (2014.01)

(52) U.S. Cl.
 CPC .............. *G06T 13/20* (2013.01); *A63F 13/58* (2014.09); *A63F 2300/64* (2013.01); *A63F 2300/646* (2013.01)

(58) Field of Classification Search
 CPC .............. A63F 2300/6661; A63F 13/52; A63F 2300/807; A63F 13/803; A63F 2300/638; A63F 2300/66; A63F 13/5258; A63F 13/56; A63F 13/47; A63F 13/55; A63F 13/58
 See application file for complete search history.

(56) References Cited

U.S. PATENT DOCUMENTS

| | | |
|---|---|---|
| 2006/0116202 A1 | 6/2006 | Nakajima |
| 2009/0104990 A1 | 4/2009 | Tsujino |
| 2011/0018868 A1* | 1/2011 | Inoue .................. A63F 13/5255 345/419 |
| 2014/0357358 A1 | 12/2014 | Shikata et al. |
| 2015/0091941 A1 | 4/2015 | Das |

FOREIGN PATENT DOCUMENTS

| | | |
|---|---|---|
| JP | 09-122354 A | 10/1995 |
| JP | 11-114230 | 4/1999 |
| JP | 11-146978 | 6/1999 |
| JP | 2014-235538 | 12/2014 |
| JP | 6050882 | 12/2016 |

OTHER PUBLICATIONS

Japanese Office Action dated Apr. 13, 2021 for Application No. JP2017-101665, 4 pages.
European Search Report dated Jun. 14, 2018 issued in corresponding EP Application No. 18168511.6 (15 pages).
Newman, "Evoland II is a grand-scale mashup of generations of games", Sep. 23, 2015, venturebeat.com, <https://venturebeat.conn/2015/09/23/evoland-2-a-mash-up-love-letter-to-generations-of-games/> (Year: 2015).
European Patent Office Communication Pursuant to Article 94(3) dated Sep. 15, 2021 for Application No. 18168511.6, 4 pages.

* cited by examiner

INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATIONS

This application is a continuation of U.S. patent application Ser. No. 15/942,739 filed Apr. 2, 2018 (now U.S. Pat. No. 10,821,362 issued on Nov. 3, 2020) which claims priority to Japanese Patent Application No. 2017-101665 filed with the Japan Patent Office on May 23, 2017, the entire contents of which are hereby incorporated by reference.

FIELD

The present disclosure relates to a non-transitory storage medium having stored therein an information processing program, an information processing device, an information processing system, and an information processing method.

BACKGROUND AND SUMMARY

A conventional video game in which an object such as a character of a player and a character of a non-player moves in a virtual space is known. In such video game, a movement limitation area of a player object is sometimes changed. For example, in JP 2014-235538 A, the movement limitation area is set to be the ground in a first state, and is set to be a wall in a second state in which the player object can move in a state of as if being adhered to a wall surface. Correspondence relationship between directions of the player object and traveling directions of before and after the switching between the states is determined in advance.

The background art described above does not disclose a correspondence relationship between speeds of a player object of before and after switching of a first state and a second state.

An object of the present disclosure is to provide an information processing program having enhanced entertainment, and imparting relevance to speeds of an object of before and after switching of movement.

A non-transitory storage medium according to one aspect has stored an information processing program for controlling movements of an object in a virtual three-dimensional space, in which the information processing program when executed by at least one processor causes the at least one processor to: control movements of the object, determine switching of the movement of the object between a three-dimensional movement in the virtual three-dimensional space and a movement in a predetermined surface provided in the virtual three-dimensional space; and determine a speed of the object after the switching on the basis of a speed of the object before the switching when the switching between the three-dimensional movement in the virtual three-dimensional space and the movement in the predetermined surface is performed.

According to the configuration, relevance can be imparted to speeds of an object by determining a speed of the object after the switching on the basis of a speed of the object before the switching, when switching is performed between a movement in a three-dimensional space and a movement in a predetermined surface. Thereby, the object can be seen as smoothly moving between the three-dimensional space and the predetermined space.

The information processing program may further cause at least one processor to determine the speed before the switching of the object as the speed after the switching. The information processing program may further cause the at least one processor to, when the switching is performed from the three-dimensional movement to the movement in the predetermined surface, determine as a speed of the movement in the predetermined surface, a speed component obtained by removing a speed component of a normal direction in a position of the object in the predetermined surface, from a speed component of the object of the three-dimensional movement before the switching. The information processing program may further cause the at least one processor to, when the switching is performed from the movement in the predetermined surface to the three-dimensional movement, use the speed component in the predetermined surface before the switching as the speed component with respect to the predetermined surface of the three-dimensional movement after the switching. According to these configurations, when the switching is performed between the movements in the virtual three-dimensional space and the predetermined surface, relevance can be appropriately imparted to the speeds.

The information processing program may further cause the at least one processor to control a display mode of the object, and display the object that moves in three dimensions, in three dimensions, and displays the object that moves in the predetermined surface in a plain surface manner or a curved surface manner. The information processing program may further cause the at least one processor to control a display mode of the object, and display the object by switching between a first object that moves in three dimensions, and a second object that moves in the predetermined surface. According to this configuration, the object can be displayed in accordance with the movements of the object. Two modes of when the object is in the virtual three-dimensional space and when in the predetermined surface can be enjoyed.

A first determination area may be provided in the virtual three-dimensional space. The information processing program may further cause the at least one processor to determine switching from the three-dimensional movement to the movement in the predetermined surface in response to entering of the object that moves in the virtual three-dimensional space, to the first determination area. The first determination area may be a space extending in a normal direction of the predetermined surface. According to this configuration, the switching determination can be easily performed by determining the entering to the first determination area.

The information processing program may further cause the at least one processor to determine switching from the three-dimensional movement to the movement in the predetermined surface in response to contact of the object that moves in the virtual three-dimensional space with the predetermined surface in the virtual three-dimensional space. Switching from the movement in the virtual three-dimensional space to the movement in the predetermined surface can be performed by a simple user interface that moves the object until the object contacts with a predetermined surface.

The information processing program may further cause the at least one processor to determine switching from the movement in the predetermined surface to the three-dimensional movement depending on whether the object that moves in the predetermined surface overlaps with a second determination area. According to this configuration, switching can be performed to the movement in the virtual three-dimensional space, out of the predetermined surface. The second determination area is identifiable from other portions, and moves in the predetermined surface. According to this configuration, in order to switch from the predetermined surface to the virtual three-dimensional space, the object has to be skillfully overlapped to the second determination area. On the other hand, in order to stay in the predetermined surface, the object has to escape not to overlap with the second determination area. In this way, a gaming property can be added also to the switching part.

The information processing program may further cause the at least one processor to, when switching is performed from the movement in the predetermined surface to the three-dimensional movement, perform at least any one of (1) setting an initial position of the object to be a position moved for a predetermined amount in a normal direction in the position of the object in the predetermined surface, and (2) imparting to the object with a speed in the normal direction. The information processing program may further cause the at least one processor to, when switching is performed from the movement in the predetermined surface to the three-dimensional movement, perform at least any one of (1) setting an initial position of the object to be a position moved for a predetermined amount in a direction in which the closest ground exists in the virtual space, and (2) imparting to the object with a speed in the direction in which the ground exists. Thereby, when switching is performed from the movement in the predetermined surface to the movement in the virtual three-dimensional space, the position of the object can be appropriately adjusted.

The information processing program may further cause the at least one processor to, when the object that moves in three dimensions in the normal direction of the predetermined surface in the virtual three-dimensional space is switched to the movement in the predetermined surface, set a direction perpendicular to the normal direction as the initial movement direction. According to this configuration, even when the object that moves in the normal direction of the predetermined surface in the virtual three-dimensional space is switched to the movement in the predetermined surface, speed relevance can be imparted.

An information processing device according to one aspect is an information processing device for controlling movements of an object in a virtual three-dimensional space. The information processing device comprises at least one processor. The at least one processor configured to: control the movements of the object; and determine switching of the movement of the object between a three-dimensional movement in the virtual three-dimensional space and a movement in a predetermined surface provided in the virtual three-dimensional space. When switching is performed between the three-dimensional movement and the movement in the predetermined surface, at least one processor determines a speed of the object after the switching on the basis of a speed of the object before the switching.

An information processing system according to one aspect is an information processing system for controlling the movements of an object in a virtual three-dimensional space. The information processing system comprises at least one processor. The at least one processor configured to: control the movements of the object; and determine switching of the movement of the object between a three-dimensional movement in the virtual three-dimensional space and a movement in a predetermined surface provided in the virtual three-dimensional space. When switching is performed between the three-dimensional movement and the movement in the predetermined surface, at least one processor determines a speed of the object after the switching on the basis of a speed of the object before the switching.

An information processing method according to one aspect is an information processing method for controlling movements of an object in a virtual three-dimensional space. The information processing method comprises: controlling the movement in three dimensions of the object in the virtual three-dimensional space; controlling the movements of the object in a predetermined surface provided in the virtual three-dimensional space; and determining switching of the movement of the object between a three-dimensional movement in the virtual three-dimensional space and a movement in a predetermined surface provided in the virtual three-dimensional space. When switching is performed between the three-dimensional movement and the movement in the predetermined surface, a speed of the object after the switching is determined on the basis of a speed of the object before the switching of the object.

DETAILED DESCRIPTION OF NON-LIMITING EXAMPLE EMBODIMENTS

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, it is possible to use as an integrated apparatus by attaching each of the left controller 3 and the right controller 4 to the main body apparatus 2. Moreover, the main body apparatus 2 and the left controller 3 and the right controller 4 can be used separately (refer to FIG. 2). In the following, a hardware configuration of the game system according to the present embodiment will be described first, and the control of the game system of the present embodiment will then be described.

Figure 1:
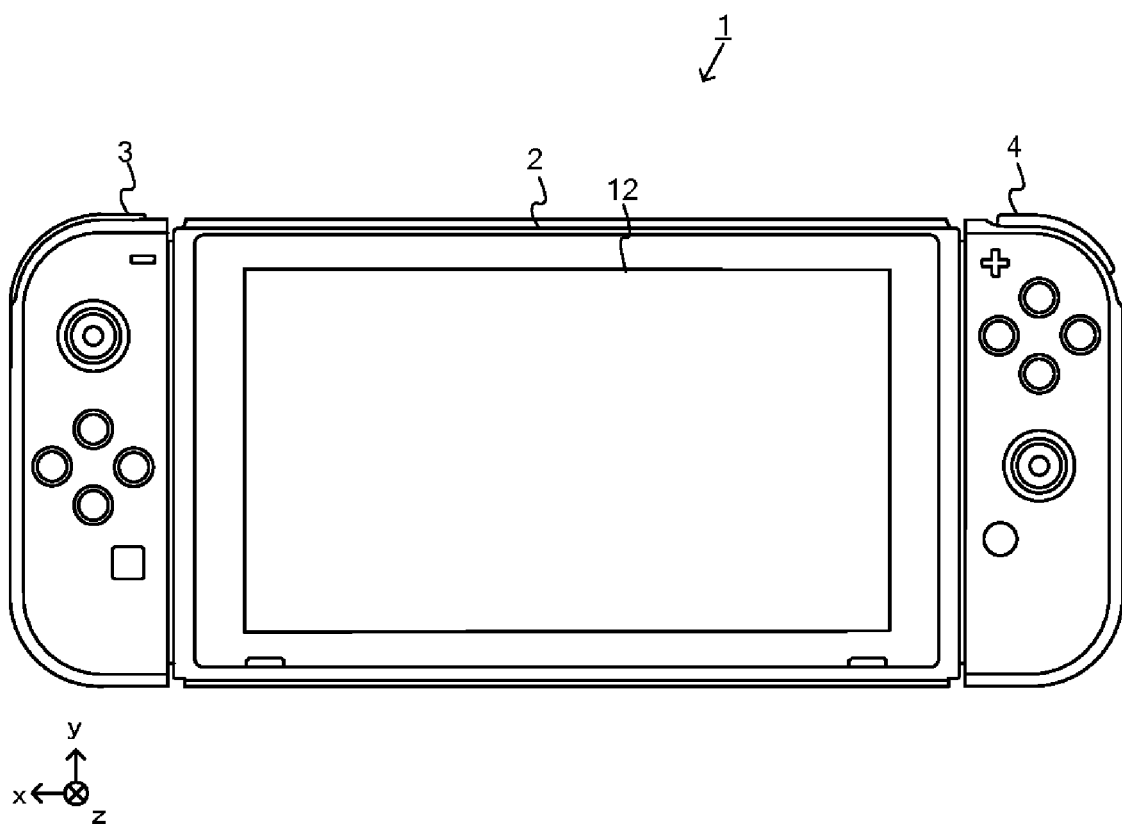
FIG. 1 is a diagram illustrating a state where a left controller and a right controller are attached to a main body device, as an example.

FIG. 1 is a diagram illustrating an example of a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
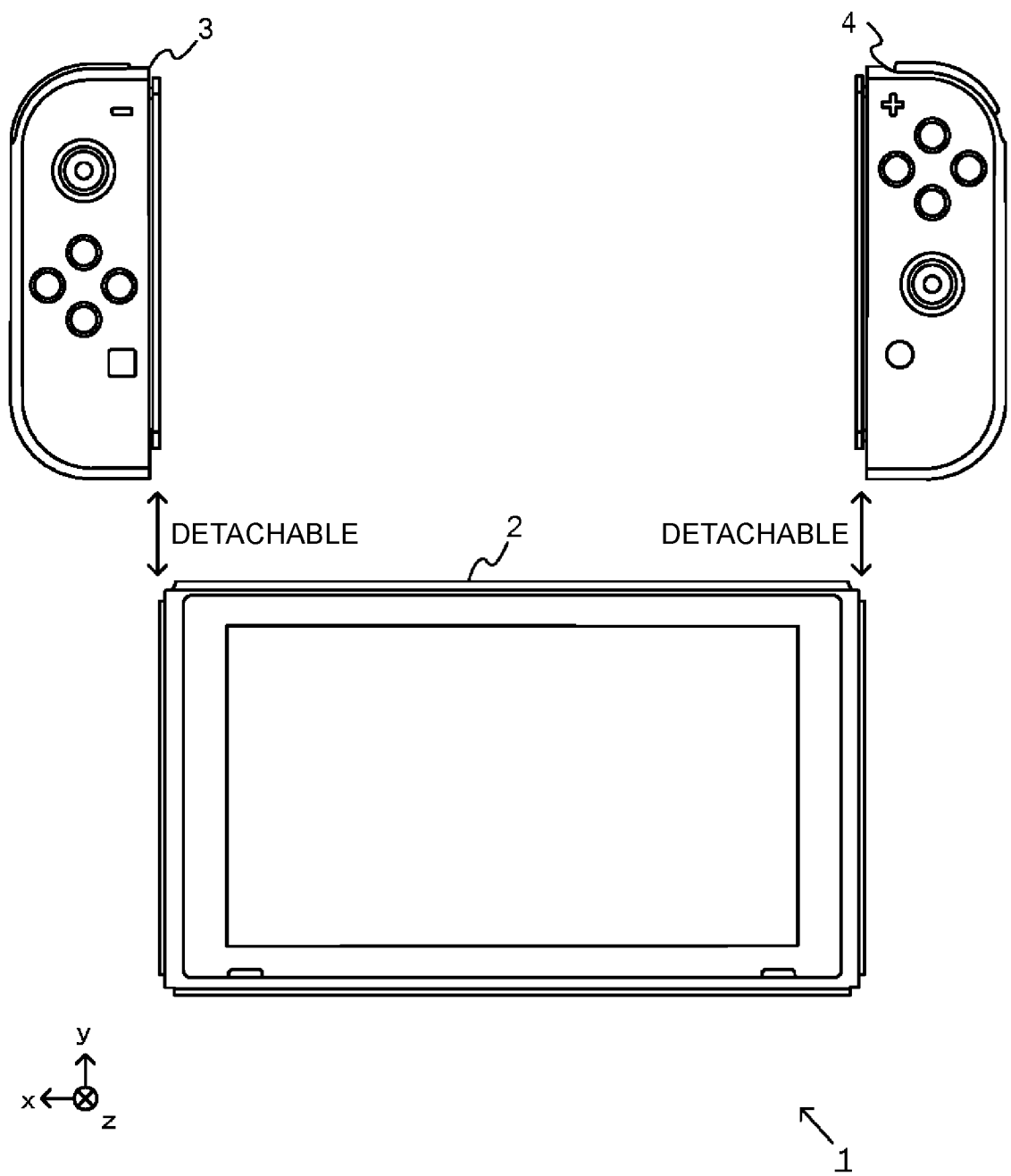
FIG. 2 is a diagram illustrating an example of a state where the left controller and the right controller are detached from the main body device.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
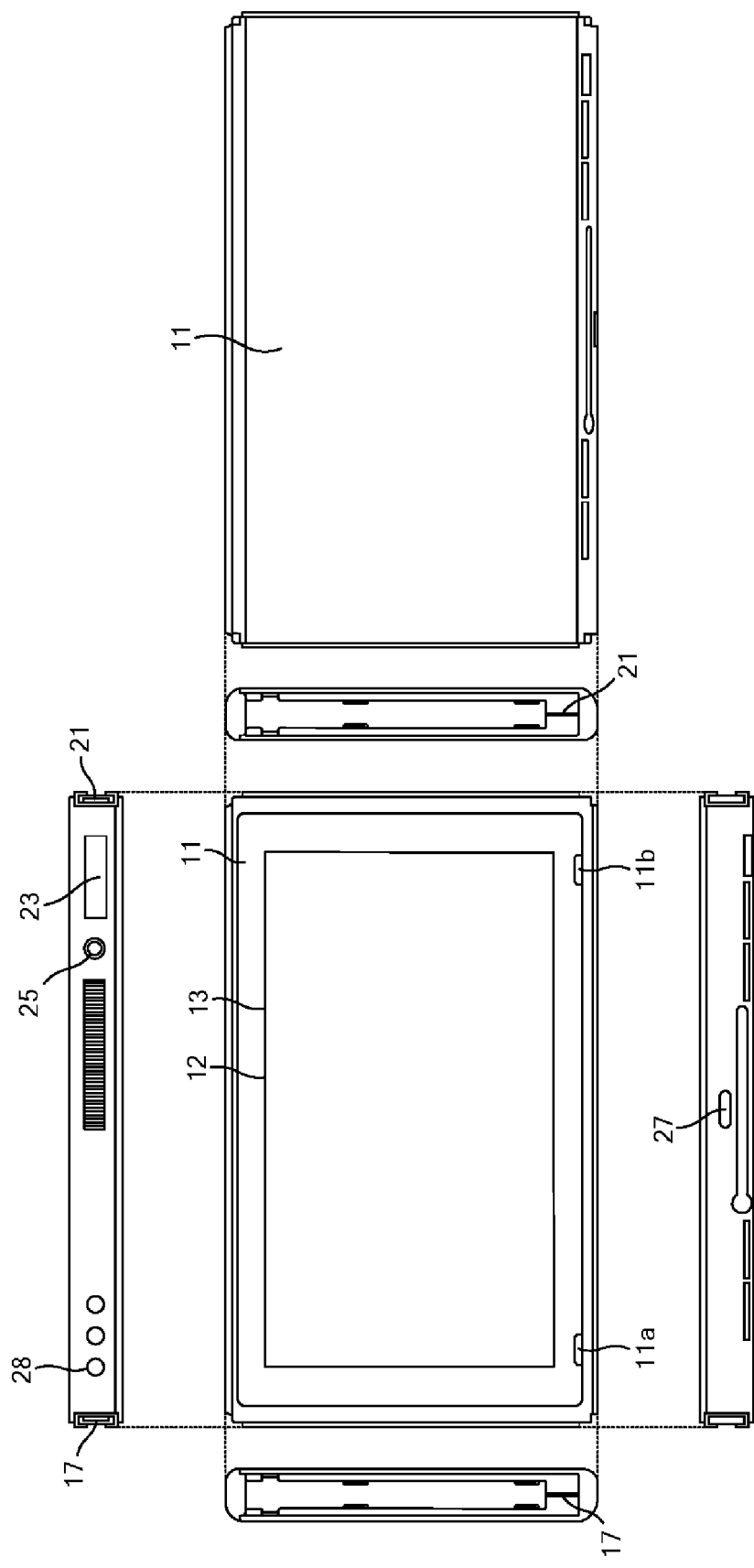
FIG. 3 is a six-surface diagram illustrating an example of the main body device.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a predetermined type of storage medium to be attached. The predetermined type of storage medium is, for example, a storage medium (for example, a dedicated memory card) dedicated to the game system 1 and the information processing apparatus of the same type as the game system 1. The predetermined type of storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
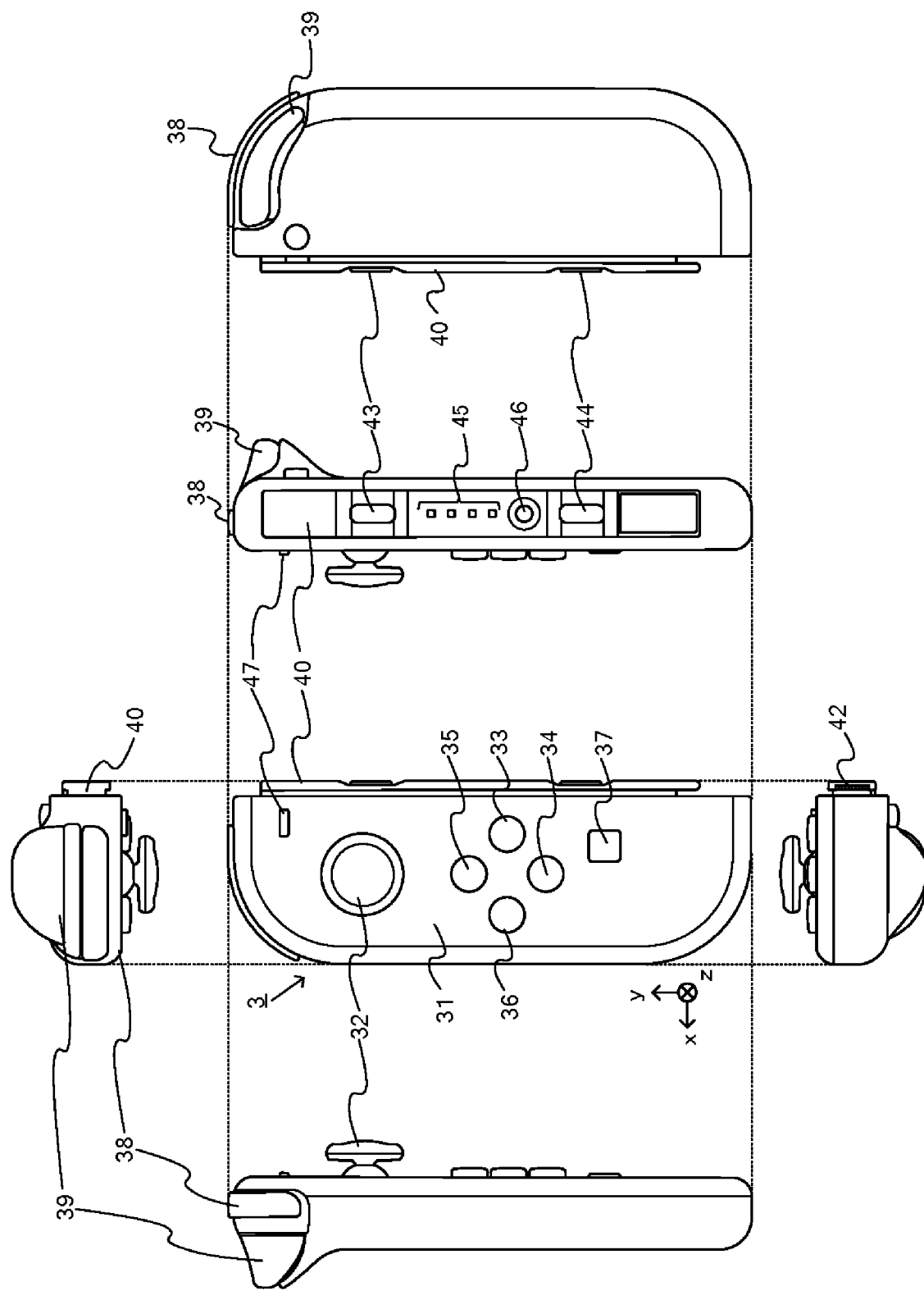
FIG. 4 is a six-surface diagram illustrating an example of the left controller.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIGS. 1 and 4). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, the left controller 3 may be provided with a cross key or a slide stick capable of slide input as the direction input unit. Moreover, an input by pressing the analog stick 32 is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, the left controller 3 includes a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
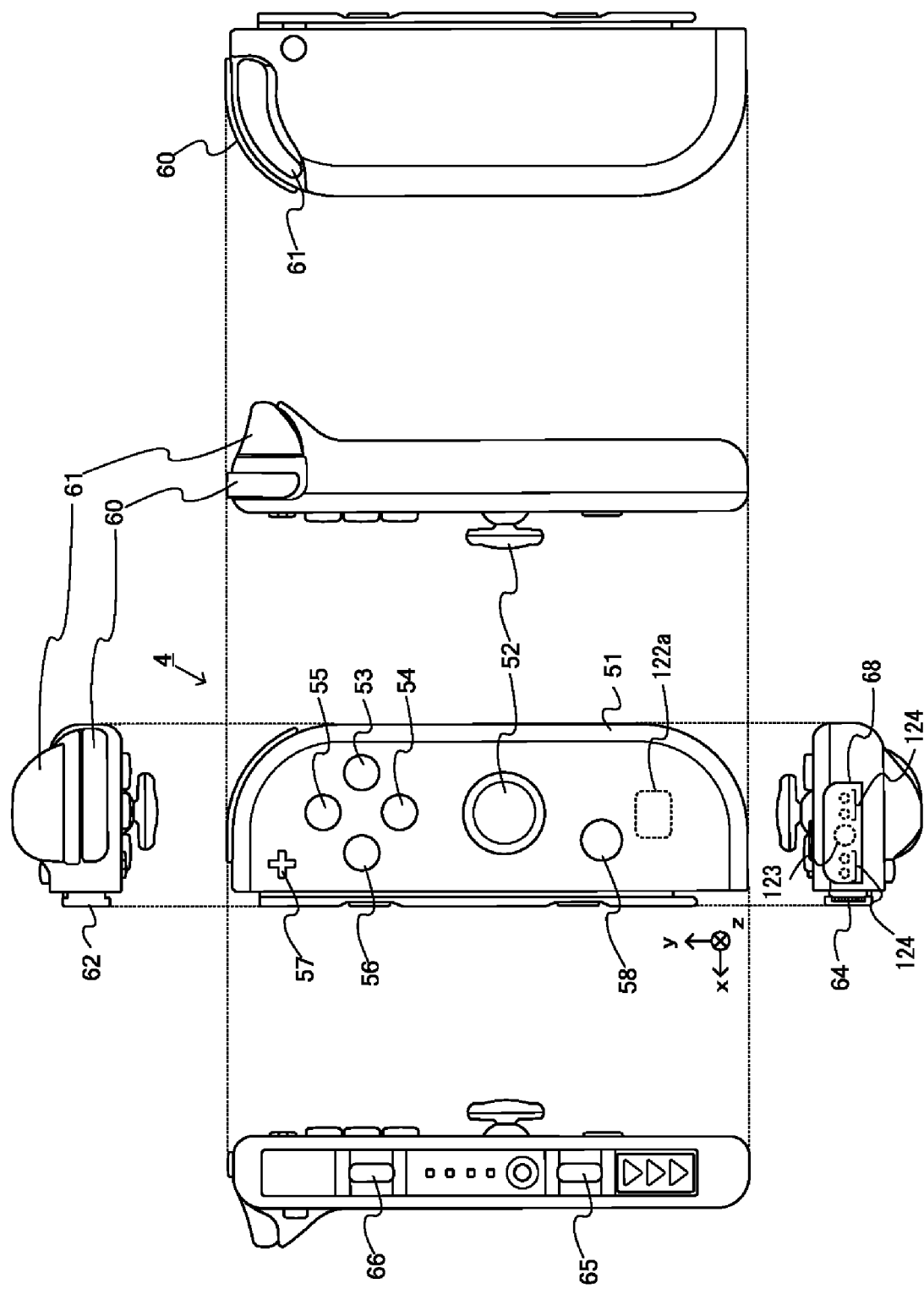
FIG. 5 is a six-surface diagram illustrating an example of the right controller.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

A lower side surface of a housing 51 is provided with a window part 68. Although details are described later, a right controller 4 includes an infrared imaging unit 123 and an infrared light emitting unit 124 arranged inside the housing 51. The infrared imaging unit 123 images a periphery of the right controller 4 through the window part 68, having a downward direction (a y-axis negative direction illustrated in FIG. 5) of the right controller 4 as an imaging direction. An infrared light emitting unit 124 irradiates an imaging target to be imaged by the infrared imaging unit 123, with infrared light through the window part 68. A predetermined range of which the center is the downward direction (the y-axis negative direction illustrated in FIG. 5) of the right controller 4, is an irradiation range. The window part 68 protects a lens of a camera of the infrared imaging unit 123, a light emitting body of the infrared light emitting unit 124, and the like, and is formed of a material (for example, a transparent material) through which light of a wavelength detected by the camera and the light with which irradiation is performed by the light emitting body, pass. The window part 68 may be a hole formed in the housing 51. In the present embodiment, the infrared imaging unit 123 itself has a filter member that prevents light of a wavelength other than light (infrared light in case of the present embodiment) detected by the camera from passing through. However, in other embodiments, the window part 68 may have a function of the filter.

Although details are described later, the right controller 4 includes an NFC communication unit 122. The NFC communication unit 122 performs near field communication based on the standard of near field communication (NFC). The NFC communication unit 122 has an antenna 122a used in the near field communication, and a circuit (for example, an NFC chip) that generates a signal (a radio wave) to be transmitted from the antenna 122a. The NFC communication unit 122 may perform the near field communication by arbitrary proximity communication (also referred to as non-contact communication), instead of performing the near field communication based on the standard of the NFC. The standard of the NFC can be used for the proximity communication (non-contact communication). The description, the NFC communication unit 122 "may perform the near field communication by arbitrary proximity communication" means that the near field communication may be performed by other proximity communication excluding the proximity communication by the standard of the NFC.

Moreover, the right controller 4 includes a terminal 64 used by the right controller 4 to perform wired communication with the main body apparatus 2.

Figure 6:
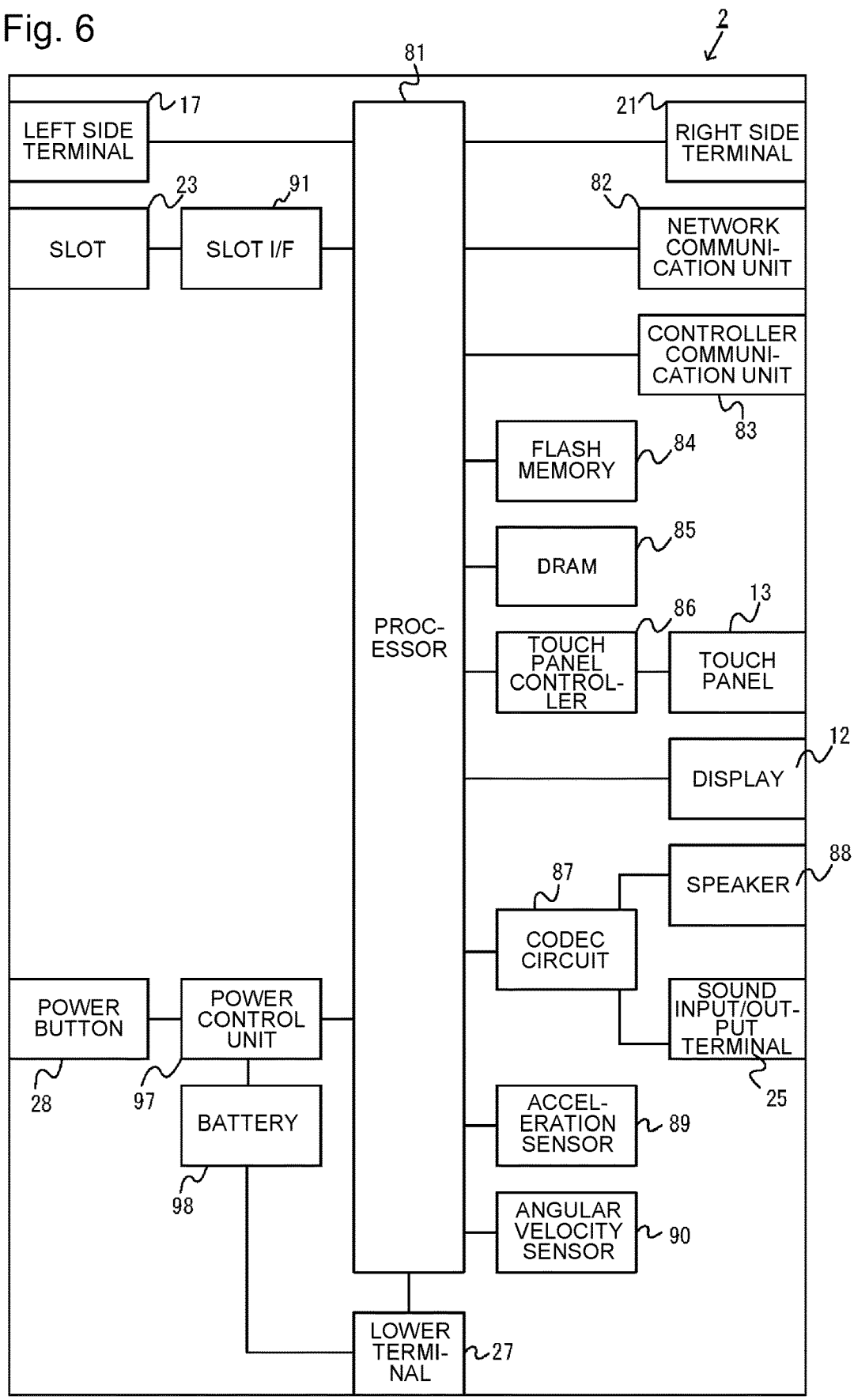
FIG. 6 is a block diagram illustrating an example an internal structure of the main body device.

FIG. 6 is a block diagram illustrating an example of the internal configuration of the main body apparatus 2. In addition to the configuration illustrated in FIG. 3, the main body apparatus 2 includes individual components 81 to 91, 97 and 98 illustrated in FIG. 6. Some of these components 81 to 91, 97 and 98 may be mounted on an electronic circuit board as electronic components and stored in the housing 11.

The main body apparatus 2 includes a processor 81. The processor 81 is an information processing unit that executes various types of information processing to be executed in the main body apparatus 2, and may be constituted only by a CPU (Central Processing Unit), for example, or it may be constituted by a system-on-a-chip (SoC) including a plurality of functions such as a CPU function and a GPU (Graphics Processing Unit) function. The processor 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the processor 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the processor 81. The slot I/F 91 is connected to the slot 23, and performs reading and writing of data from/into a predetermined type of storage medium (for example, a dedicated memory card) attached to the slot 23 in accordance with an instruction of the processor 81.

The processor 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the processor 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the processor 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The processor 81 is connected to the left side terminal 17, the right side terminal 21, and the lower terminal 27 described above. In a case of performing wired communication with the left controller 3, the processor 81 transmits data to the left controller 3 via the left side terminal 17 and receives operation data from the left controller 3 via the left side terminal 17. Moreover, in a case of performing wired communication with the right controller 4, the processor 81 transmits data to the right controller 4 via the right side terminal 21 and receives operation data from the right controller 4 via the right side terminal 21. Moreover, in a case of communicating with the cradle, the processor 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4. As an example, the first user inputs to the main unit 2 using the first set of the left controller 3 and the right controller 4, and at the same time the second user uses the second set of the left controller 3 and the right controller 4 to input to the main body device 2.

The main body apparatus 2 includes a touch panel controller 86 as a circuit for controlling the touch panel 13. The touch panel controller 86 is connected between the touch panel 13 and the processor 81. The touch panel controller 86 generates, for example, data indicating a position of input of a touch input on the basis of a signal from the touch panel 13 and outputs the generated data to the processor 81.

Moreover, the display 12 is connected to the processor 81. The processor 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the processor 81. The codec circuit 87 is a circuit for controlling input and output of sound data to and from the speaker 88 and the sound input/output terminal 25.

The main body apparatus 2 also includes an acceleration sensor 89. In the present embodiment, the acceleration sensor 89 detects the magnitude of the acceleration in predetermined three axes (for example, the x-, y-, z-axes illustrated in FIG. 1) directions. Note that the acceleration sensor 89 may be configured to detect accelerations in one axial direction or two axial directions.

Moreover, the main body apparatus 2 includes an angular velocity sensor 90. In the present embodiment, the angular velocity sensor 90 detects an angular velocity around predetermined three axes (for example, the x-, y-, z-axes illustrated in FIG. 1). Note that the angular velocity sensor 90 may detect angular velocity about one axis or around two axes.

The acceleration sensor 89 and the angular velocity sensor 90 are connected to the processor 81, and the detection results of the acceleration sensor 89 and the angular velocity sensor 90 are output to the processor 81. The processor 81 can calculate information related to one or both of the movement and posture of the main body apparatus 2 on the basis of the detection results of the acceleration sensor 89 and the angular velocity sensor 90.

The main body apparatus 2 includes a power control unit 97 and a battery 98. The power control unit 97 is connected to the battery 98 and the processor 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the processor 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
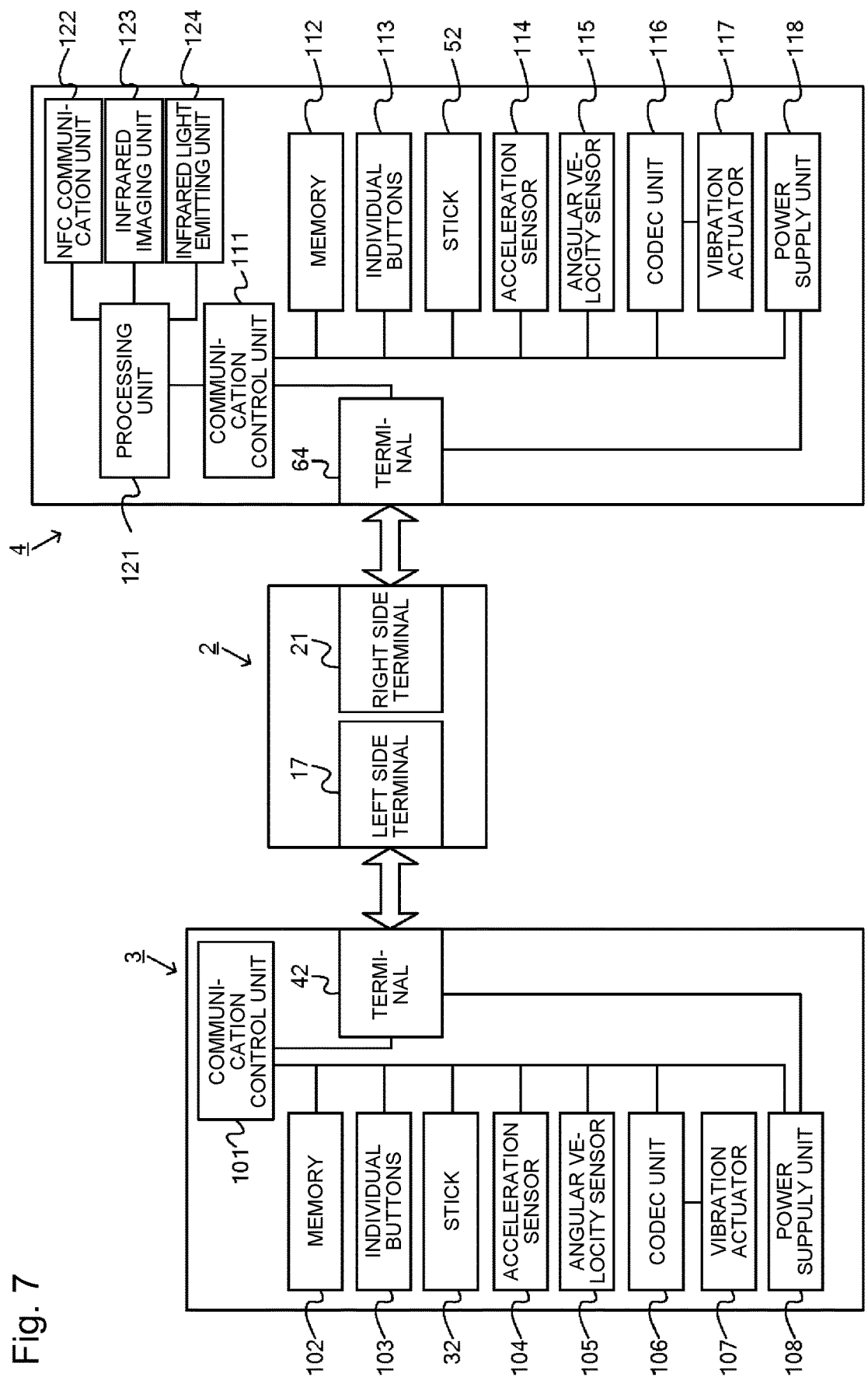
FIG. 7 is a block diagram illustrating an example of internal structures of the main body device, and the left controller and the right controller.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, the left controller 3 includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data. Moreover, the main body apparatus 2 can calculate information related to one or both of the movement and the posture of the left controller 3 on the basis of operation data (specifically, detection results of the acceleration sensor 104 and the angular velocity sensor 105).

The left controller 3 includes a vibration actuator 107 for notifying the user by vibration. In the present embodiment, the vibration actuator 107 is controlled by a command from the main body apparatus 2. That is, upon receiving the command from the main body apparatus 2, the communication control unit 101 drives the vibration actuator 107 in accordance with the command. The left controller 3 includes a codec unit 106. Upon receiving the above-described command, the communication control unit 101 outputs to the codec unit 106 a control signal corresponding to the command. The codec unit 106 generates a drive signal for driving the vibration actuator 107 from the control signal from the communication control unit 101 and supplies the generated signal to the vibration actuator 107. This causes the vibration actuator 107 to operate.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 also includes a vibration actuator 117 and a codec unit 116. The vibration actuator 117 and the codec unit 116 operate similarly to the vibration actuator 107 and the codec unit 106 of the left controller 3. That is, the communication control unit 111 causes the vibration actuator 117 to operate using the codec unit 116 in accordance with a command from the main body apparatus 2.

The right controller 4 includes the NFC communication unit 122 that performs the near field communication based on the standard of the NFC. The NFC communication unit 122 has a function of, so called a NFC reader/writer. In the present specification, the near field communication includes a communication method of, by a radio wave (for example, by electromagnetic induction) from one device (here, the right controller 4), generating an electromotive force to another device (here, a device that is proximate to the antenna 122*a*). The another device can be operated by the generated electromotive force, and may have and may not have a power supply. When the right controller 4 (antenna 122*a*) and a communication target proximate to each other (typically, when a distance between them is ten and several centimeters or less), the NFC communication unit 122 can communicate with the communication target. The communication target is an arbitrary device that can perform the near field communication with the NFC communication unit 122, and is, for example, a storage medium having an NFC tag or a function of an NFC tag. The communication target may be another device that has a card emulation function of the NFC.

The right controller 4 includes the infrared imaging unit 123. The infrared imaging unit 123 has an infrared camera that images the periphery of the right controller 4. As an example, the main body device 2 and/or the right controller 4 calculates imaged information (for example, information related to the brightness of a plurality of blocks obtained by dividing the entire region of at least a part of the imaged image), to determine the change in the periphery of the right controller 4 on the basis of the information. The infrared imaging unit 123 may perform imaging with ambient light. However, in the present embodiment, the infrared imaging unit 123 has the infrared light emitting unit 124 that emits infrared light. For example, the infrared light emitting unit 124 emits the infrared light by synchronously with timing of imaging of the image by the infrared camera. The infrared light emitted by the infrared light emitting unit 124 is reflected by the imaging target, and the reflected infrared light is received by the infrared camera, and thereby, the infrared image is acquired. Thereby, the infrared imaging unit 123 can acquire a clearer infrared image. The infrared imaging unit 123 and the infrared light emitting unit 124 may be provided in the right controller 4 as separate devices, and may be provided in the right controller 4 as a single device provided in the same package. In the present embodiment, the infrared imaging unit 123 having the infrared camera is used. However, in the other embodiments, a visible light camera (a camera using a visible light image sensor) may be used instead of the infrared camera as an imaging means.

The right controller 4 includes a processing unit 121. The processing unit 121 is connected to the communication control unit 111. The processing unit 121 is connected to the NFC communication unit 122, the infrared imaging unit 123, and the infrared light emitting unit 124. The processing unit 121 performs management processing with respect to the NFC communication unit 122 in response to an instruction from the main body device 2. For example, the processing unit 121 controls operation of the NFC communication unit 122 in response to the instruction from the main body device 2. The processing unit 121 controls activation of the NFC communication unit 122, and controls operation (particularly, reading, writing, and the like) of the NFC communication unit 122 with respect a communication target (for example, an NFC tag). The processing unit 121 receives from the main body device 2, information to be transmitted to the communication target via the communication control unit 111 to pass the information to the NFC communication unit 122, and acquires from the NFC communication unit 122, information received from the communication target, to transmit the information to the main body device 2 via the communication control unit 111.

The processing unit 121 includes a CPU, a memory, and the like, and performs management processing with respect to the infrared imaging unit 123 in response to the instruction from the main body device 2 on the basis of a predetermined program (for example, an application program for performing image processing and various calculation) stored in a storage device (for example, a non-volatile memory, or the like) not illustrated, that is included in the right controller 4. For example, the processing unit 121 causes the infrared imaging unit 123 to perform imaging operation, and acquires and/or calculates information (information of the captured image, information calculated from the information, or the like) based on an imaging result, to transmit the information to the main body device 2 via the communication control unit 111. The processing unit 121 performs management processing with respect to the infrared light emitting unit 124 in response to the instruction from the main body device 2. For example, the processing unit 121 controls emission of the infrared light emitting unit 124 in response to the instruction from the main body device 2. A memory used when the processing unit 121 performs processing may be provided in the processing unit 121, and may be a memory 112.

The right controller 4 includes a power supply unit 118. The power supply unit 118 has a similar function to that of a power supply unit 108 of the left controller 3, and operates as similar to the power supply unit 108.

(Configuration of Game Program)

Next, a game realized by performing a game program on the game device main body 2 of the present embodiment will be described. As described above, the game program is stored in an internal storage medium such as a flash memory 84 of the game device main body 2, an external storage medium attached to a slot 23, or the like. In the game of the present embodiment, a character (corresponding to the "object") of a game moves in the virtual three-dimensional space. Hereinafter, a function of the game device main body 2 realized by executing the game program of the present embodiment will be described to describe the configuration of the game program.

Figure 8:
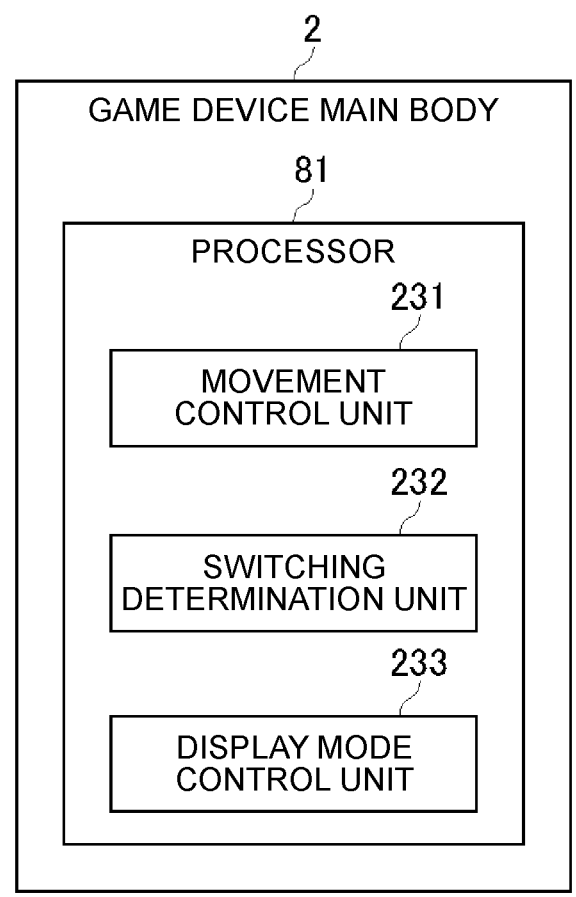
FIG. 8 is a diagram illustrating a function of a game device of the present embodiment as an example.

FIG. 8 is a diagram illustrating a function realized when the game program is executed by a processor 81 (see FIG. 6) of the game device main body 2. FIG. 8 illustrates only functions related to the embodiments described below, and does not illustrate other functions for game proceeding.

When the game program of the present embodiment is performed by the processor 81, the functions of a movement control unit 231, a switching determination unit 232, and a display mode control unit 233 are realized. The movement control unit 231 controls the movement of the object such as a character 200. The switching determination unit 232 has a function of determining whether the object such as the character 200 is switched between the virtual three-dimensional space and the predetermined surface. The display mode control unit 233 has a function of controlling the mode of displaying the object in the virtual three-dimensional space and the predetermined surface.

Figure 9A:
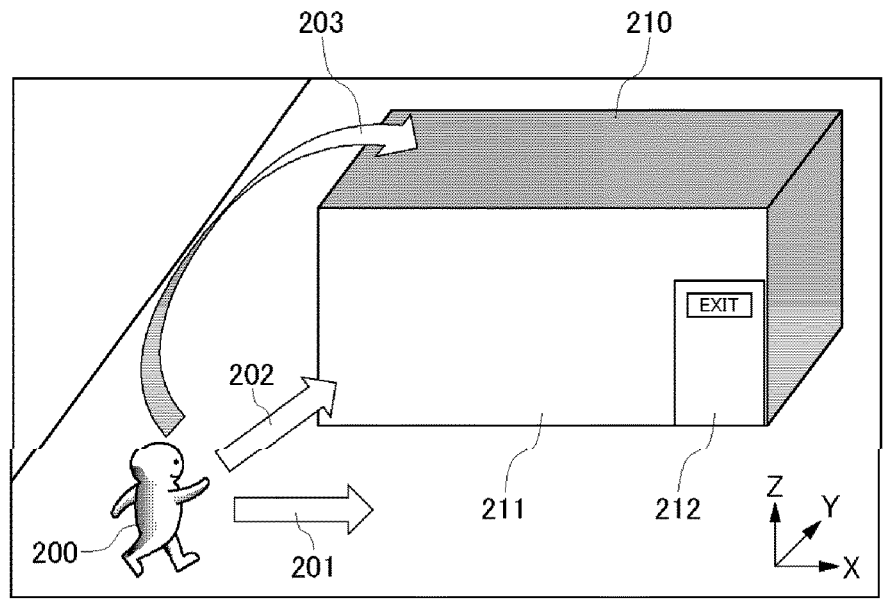
FIG. 9A is a diagram illustrating a situation where a character of a player moves in a virtual three-dimensional space, as an example.

The movement control unit 231 moves the character 200 of the game to a three-dimensional direction in the virtual three-dimensional space. FIG. 9A is a diagram illustrating a situation where the character 200 of the player moves in the virtual three-dimensional space. A plain surface consists of an X-axis and a Y-axis represents a horizontal surface, and a Z-axis represents a vertical direction. The character 200 of the player can freely move on the XY plain surface (see arrows 201, 202), and, in addition to that, can jump to ride on a rooftop of a building 210 (see an arrow 203). The character 200 can move in any directions of the X-axis, Y-axis, and Z-axis. FIG. 9A shows the character 200 of the player as an example. However, a character of a non-player can move in the virtual three-dimensional space as similar to the character 200 of the player.

A predetermined surface in which the character 200 can enter and move is provided in the virtual three-dimensional space. In the example illustrated in FIG. 9A, a wall surface of a front surface of a building is a predetermined surface 211. When the character 200 enters a first determination area described later, that is provided in the virtual three-dimensional space, the character 200 enters the predetermined surface 211.

Figure 10A:
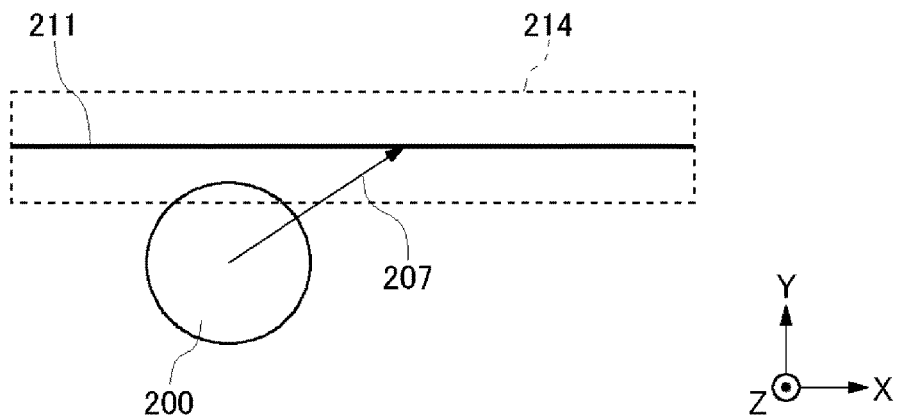
FIG. 10A is a diagram illustrating an example in which an invisible space having a width in a normal direction of a predetermined surface (plain surface) is provided, and switching between the virtual three-dimensional space to the predetermined surface is performed.
Figure 10B:
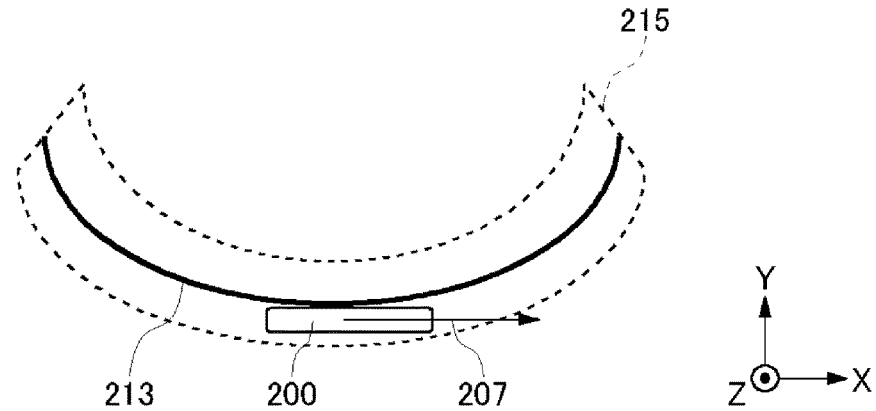
FIG. 10B is a diagram illustrating an example in which an invisible space having a width in a normal direction of a predetermined surface (curved surface) is provided, and switching is performed from the virtual three-dimensional space to the predetermined surface.

FIG. 10A and FIG. 10B are diagrams for explaining the first determination area 214 that is for performing the switching determination to the predetermined surface 211. FIG. 10A and FIG. 10B are diagrams viewing the virtual three-dimensional space from upward, in which the predetermined surface extends in a front direction (the Z-axis direction) of the diagrams. As shown in FIG. 10A, the first determination area 214 having a width in the normal direction of the predetermined surface 211 is provided. When the character 200 enters the first determination area 214, the switching determination unit 232 determines that a movement area of the character 200 is changed to switching from the virtual three-dimensional space to the predetermined surface 211. In response to that, the display mode control unit 233 changes display of the character 200 to display in a plain surface manner, and causes the character 200 to be absorbed to the predetermined surface 211. Thereby, determination of switching to the movement in the predetermined surface 211 can be easily performed. The first determination area 214 may be visible or invisible.

As illustrated in FIG. 10B, such switching processing is effective even when the predetermined surface 213 is a curved surface. When the predetermined surface 213 is a curved surface, the first determination area 215 is provided along the predetermined surface 213 of the curved surface as illustrated in FIG. 10B. Even when the character 200 displayed in a plain surface manner moves in a tangential direction of the curved surface away from the curved surface, since the character 200 is in the first determination area 215, the character 200 is absorbed to the predetermined surface 213 again. Thus, the movement in the curved surface is realized.

Figure 9B:
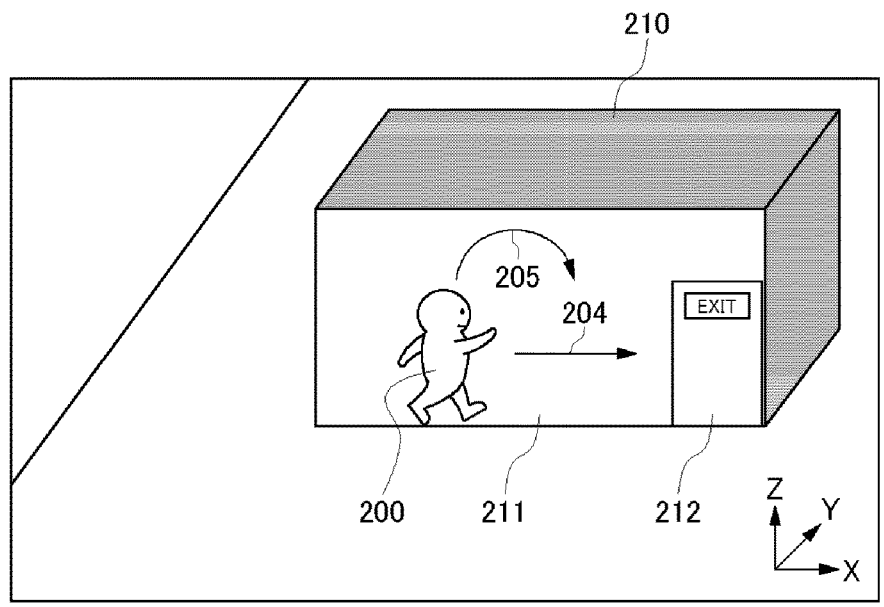
FIG. 9B is a diagram illustrating a situation where a character of a player moves in a predetermined surface, as an example.

In the virtual three-dimensional space, the character 200 has a three-dimensional shape. However, when the character 200 enters the predetermined surface 211, as illustrated in FIG. 9B, the character 200 has a plain surface as if the character 200 becomes a part of the predetermined surface 211 provided in the wall surface. Thereby, the user can recognize that the character 200 has entered the predetermined surface 211.

As illustrated in FIG. 9B, the movement of the character 200 in the normal direction of the predetermined surface 211 is limited in the predetermined surface 211. In the predetermined surface 211, the character 200 can move along the predetermined surface 211 (see arrow 204), and jump along the predetermined surface 211 (see arrow 205). However, the character 200 cannot move from the predetermined surface 211 to the front, and cannot move to the back. That is, in the predetermined surface 211 illustrated in FIG. 9B, the movement of the character 200 is limited to within the XZ plain surface.

As illustrated in FIG. 9B, a second determination area 212 with description of, for example, "EXIT" is prepared in the predetermined surface 211. When the character 200 moves to the second determination area 212 to overlap with the second determination area 212, the character 200 can exit the predetermined surface 211. The second determination area 212 with description of "EXIT" has been described as an example. However, various provision modes of the second determination area 212 for exiting the predetermined surface 211 can be considered. For example, the area for exiting the predetermined surface may not be fixed and may be moved. A configuration also can be considered, in which the predetermined surface itself is moved, the character 200 is allowed to stay within the predetermined surface only when the character 200 overlaps with the predetermined surface, and the character 200 is returned to the virtual three-dimensional space when the character 200 does not overlap with the predetermined surface anymore.

Figure 11A:
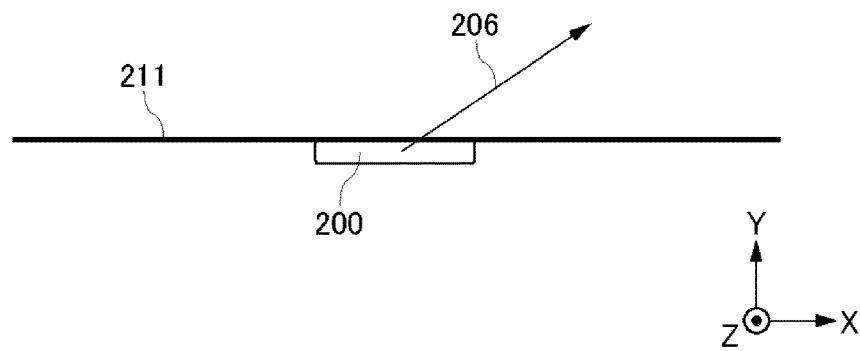
FIG. 11A is a diagram illustrating a movement direction and a speed of the character, input by the user, as an example.
Figure 11B:
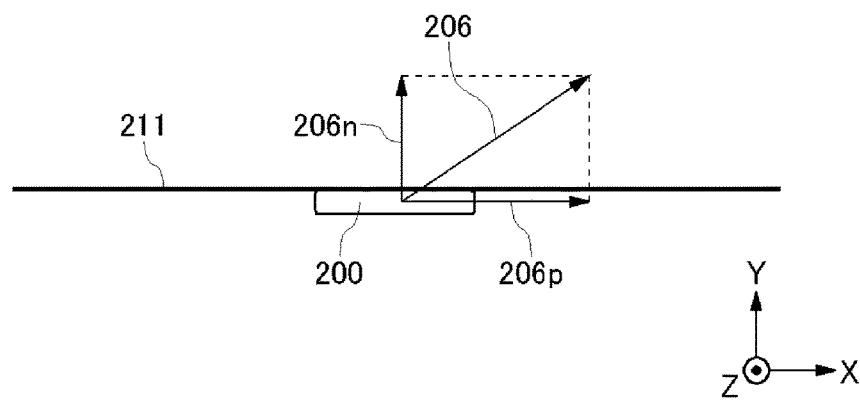
FIG. 11B is a diagram in which a virtual speed vector imparted by an input instruction is decomposed.
Figure 11C:
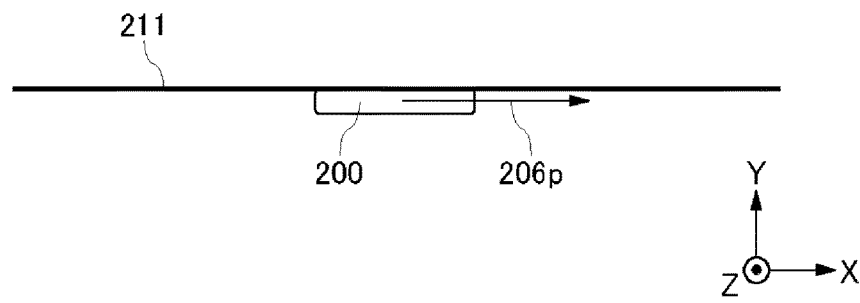
FIG. 11C is a diagram illustrating a movement direction and a speed of the character in the predetermined surface, as an example.

FIG. 11A to FIG. 11C are diagrams illustrating relationship between an input instruction from the user and operation of the character 200 in the predetermined surface. FIG. 11A to FIG. 11C are diagrams viewing the virtual three-dimensional space from upward, in which the predetermined surface 211 extends in the front direction (Z-axis direction) of the diagrams. As illustrated in FIG. 11A, when the character 200 moves in the predetermined surface 211, the character 200 is displayed in a plain surface manner. In this state, it is assumed that an instruction to move the character 200 in the direction of an arrow 206 in FIG. 11A is input. At this time, as illustrated in FIG. 11B, the movement control unit 231 decomposes a virtual speed vector 206 imparted by the input instruction into a component 206n of the normal direction of the predetermined surface 211, and a component 206p that is parallel to the predetermined surface 211. Since the movement in the normal direction is limited in the predetermined surface 211, the speed component 206n of the normal direction is cut, and as illustrated in FIG. 11C, the speed component 206p in the predetermined surface 211 is determined. The character 200 is moved in the predetermined surface 211 by using the speed component 206p.

FIG. 11A to FIG. 11C are diagrams viewing the predetermined surface 211 from upward, and a case where an input is performed to a horizontal direction (XY plain surface) has been described as an example. As similar to the case, when an input is performed to a vertical direction (Z-axis direction), the speed component 206n in the normal direction is cut to calculate the movement in the predetermined surface 211. An example in which the speed component 206n in the normal direction is cut, and the speed component 206p in the predetermined surface is set as an amount of the speed in the predetermined surface 211, has been described. However, an amount of the virtual speed component 206 input may be set as the amount of the speed in the predetermined surface 211.

Figure 12A:
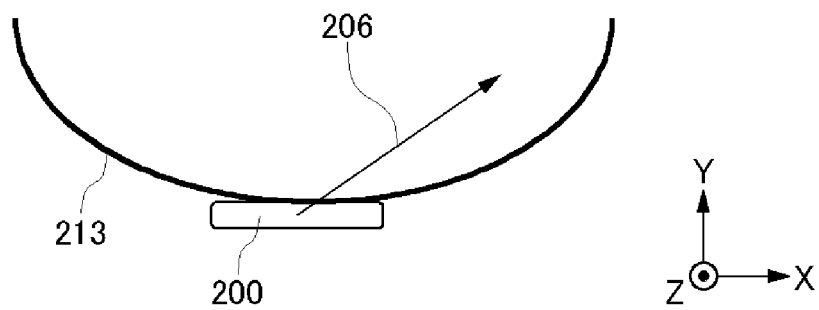
FIG. 12A is a diagram illustrating a movement direction and a speed of the character, input by the user, as an example.
Figure 12B:
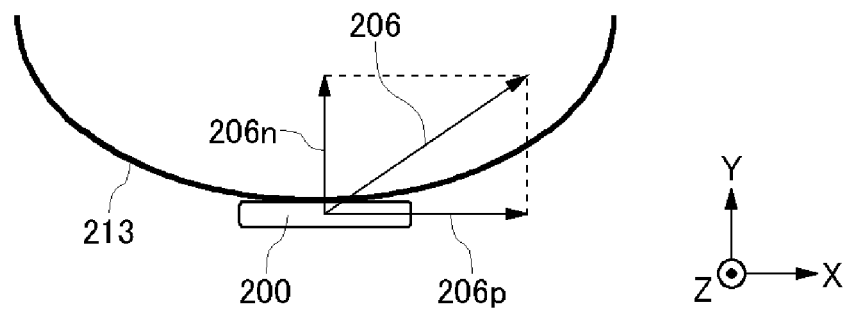
FIG. 12B is a diagram in which a virtual speed vector imparted by an input instruction is decomposed.
Figure 12C:
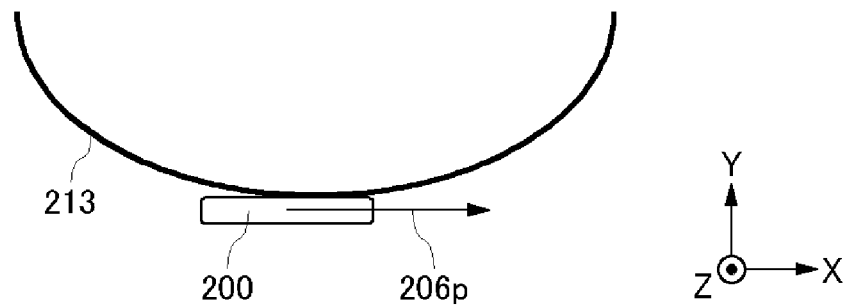
FIG. 12C is a diagram illustrating a movement direction and a speed of the character in the predetermined surface, as an example.

In FIG. 11A to FIG. 11C, a case where the predetermined surface 211 is a plain surface has been described as an example. However, the predetermined surface 211 is not limited to a plain surface. For example, the predetermined surface 211 may be a surface of a column, or a surface of a sphere. FIG. 12A to FIG. 12C are diagrams illustrating the movement of the character 200 of when the predetermined surface 213 is a surface of a column.

It is assumed that an instruction to move the character 200 in the direction of an arrow 206 in FIG. 12A is input. When the predetermined surface 213 is a curved surface, a tangential line of the predetermined surface 213 in a place where the character 200 is located, is determined to define the normal direction with respect to the tangential line. As illustrated in FIG. 12B, the movement control unit 231 decomposes the virtual speed vector 206 imparted by the input instruction into the component 206n of the normal direction, and the component 206p of the tangential direction. Since the movement in the normal direction is limited in the predetermined surface 213, the speed component 206n of the normal direction is cut, and as illustrated in FIG. 12C, the speed component 206p in the predetermined surface 213 is determined. The character 200 is moved in the predetermined surface 213 by using the speed component 206p.

In FIG. 12A to FIG. 12C, an example in which the character 200 is displayed in a plain surface manner has been described. However, as another embodiment, the character 200 may be configured to have a curved surface shape in accordance with the curved surface shape of the predetermined surface 213. If the character 200 is relatively large, the character 200 looks more like moving in the predetermined surface 211 that is a curved surface when the character 200 is in accordance with the curved surface.

In the game program of the present embodiment, the character 200 moves between the virtual three-dimensional space and the predetermined surface 211, and when switching is performed between the movement in the three-dimensional direction and the movement in the predetermined surface 211, the speed of the movement of the character 200 after the switching is determined on the basis of the movement speed of the character 200 before the switching.

Figure 13A:
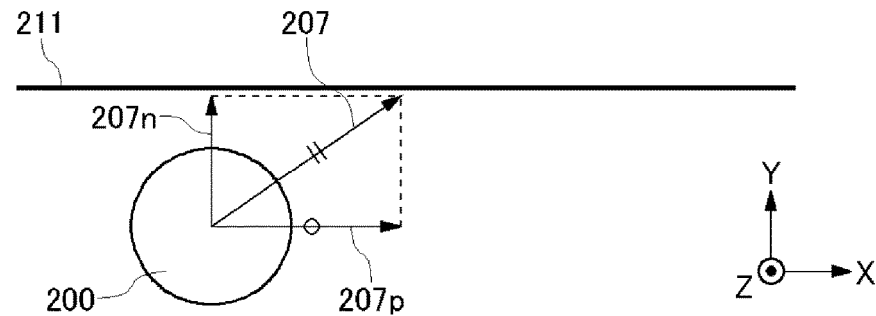
FIG. 13A is a diagram illustrating a situation where the character moves in the virtual three-dimensional space, as an example.
Figure 13B:
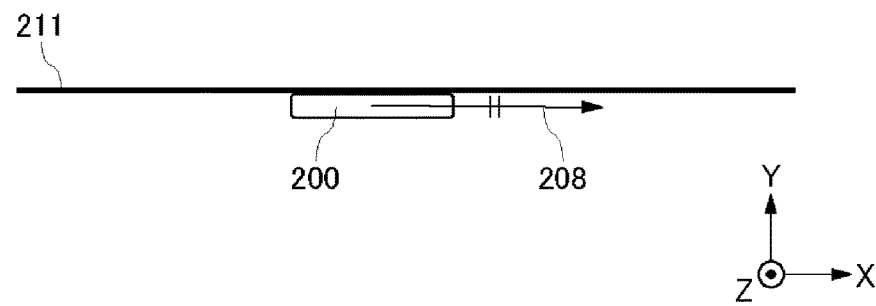
FIG. 13B is a diagram illustrating a speed of when the character starts the movement in the predetermined surface, as an example.
Figure 13C:
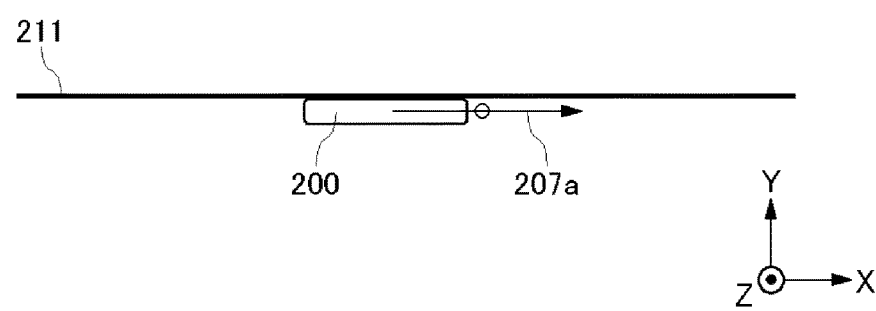
FIG. 13C is a diagram illustrating another example of a speed of when the character starts the movement in the predetermined surface.

FIG. 13A to FIG. 13C are diagrams for explaining the speed of when switching is performed from the virtual three-dimensional space to the predetermined surface 211. FIG. 13A to FIG. 13C are diagrams viewing the virtual three-dimensional space from upward, in which the predetermined surface 211 extends in the front direction of the diagrams. FIG. 13A illustrates a situation where the character 200 moves in the virtual three-dimensional space, and approaches to the predetermined surface 211 in the speed vector 207 from a diagonal direction. At this time, the character 200 has a three-dimensional shape.

When the character 200 enters the first determination area 214 not illustrated in FIG. 13, as illustrated in FIG. 13B, the character 200 is deformed to be a plain surface shape along the predetermined surface 211. The character 200 continues moving in a state where the movement in the normal direction of the predetermined surface 211 is limited. In the game program of the present embodiment, the speed 208 of the character 200 of when the character 200 enters the predetermined surface 211 is the same as the amount of the moving speed 207 in the virtual three-dimensional space. That is, the amount of the speed 207 of a direction of traveling diagonally in the virtual three-dimensional space, is the speed 208 in a traveling direction in the predetermined surface 211. FIG. 13B is a diagram viewing the virtual three-dimensional space from upward, and does not illustrate the speed of the vertical direction (Z-axis direction). However, in the virtual three-dimensional space, if the character 200 has the speed component in the vertical direction, the speed component is also maintained.

In the present embodiment, an example in which the amount of the speed in the virtual three-dimensional space before the switching is maintained has been described. However, as a modification, as illustrated in FIG. 13C, only the speed component of the movement direction in the predetermined surface 211 among the speed components in the virtual three-dimensional space before the switching may be maintained. Specifically, the speed 207 of traveling in the diagonal direction in the virtual three-dimensional space is decomposed into the speed component 207n of the normal direction of the predetermined surface 211, and the speed component 207p in the plain surface that is parallel to the predetermined surface, the speed component 207n of the normal direction of the predetermined surface 211 is cut, and the speed component 207p is determined as the speed component 207a.

On the contrary to the example described above, the speed of when the character 200 that has been in the predetermined surface 211 enters the virtual three-dimensional space, is also maintained. Specifically, the movement of the character 200 in the virtual three-dimensional space is started in the movement direction and the movement speed of when the character 200 exits the predetermined surface 211.

Figure 14A:
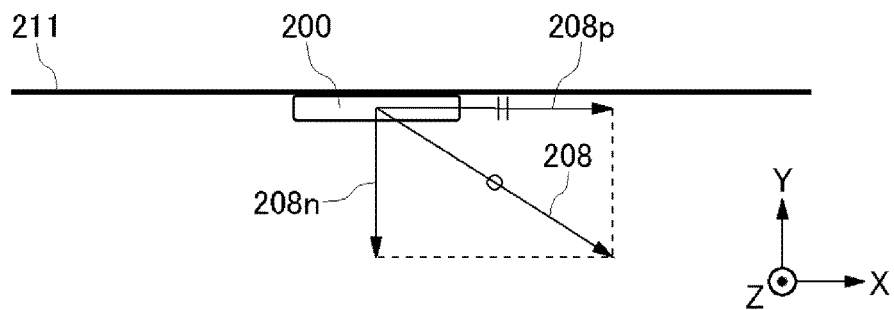
FIG. 14A is a diagram illustrating an instruction of the movement input with respect to the character in a predetermined surface 211, as an example.
Figure 14B:
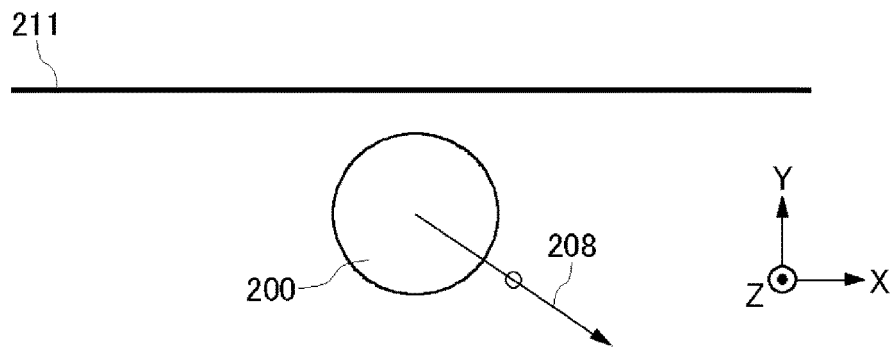
FIG. 14B is a diagram illustrating a speed of when the character moves from the predetermined surface 211 to the virtual three-dimensional space, as an example.

FIG. 14A and FIG. 14B are diagrams for explaining the speed of when the character 200 moves from the predetermined surface 211 to the virtual three-dimensional space. FIG. 14A and FIG. 14B are diagrams viewing the virtual three-dimensional space from upward, in which the predetermined surface 211 extends in the front direction of the diagrams. FIG. 14A illustrates a situation where the character 200 moves in the predetermined surface 211. The input by the user is performed in the direction of traveling in the direction 208 that is in the diagonally front. In the predetermined surface 211, the movement in the normal direction of the predetermined surface 211 is limited. Thus, the speed component 208n of the normal direction is cut, and the character 200 moves in the speed 208p along the predetermined surface 211.

When the character 200 overlaps with the second determination area 212, and is determined to be switched to the virtual three-dimensional space, the normal component 208n in which the movement in the predetermined surface 211 is limited is utilized so that the character 200 moves in the virtual speed 208 in the predetermined surface 211 as illustrated in FIG. 14B. In this way, relevance can be imparted to the speed of the character 200 of when the switching is performed from the predetermined surface 211 to the virtual three-dimensional space. FIG. 14B illustrates an example in which the speed 208 that is not realized in the predetermined surface 211, is the speed in the virtual three-dimensional space. However, the speed 208p realized in the predetermined surface 211 may be the speed in the virtual three-dimensional space.

In regard to the relevance of the speed of the character 200 at the time of switching between the virtual three-dimensional space and the predetermined surface 211, the speed based on the input imparted to the character 200 from the user has been mainly described above. However, for example, when the gravity and an attracting force acting in a predetermined direction are set in the virtual three-dimensional space and the predetermined surface 211, the speed of the character 200 after the switching may be determined also on the basis of the influence of these forces.

Figure 15A:
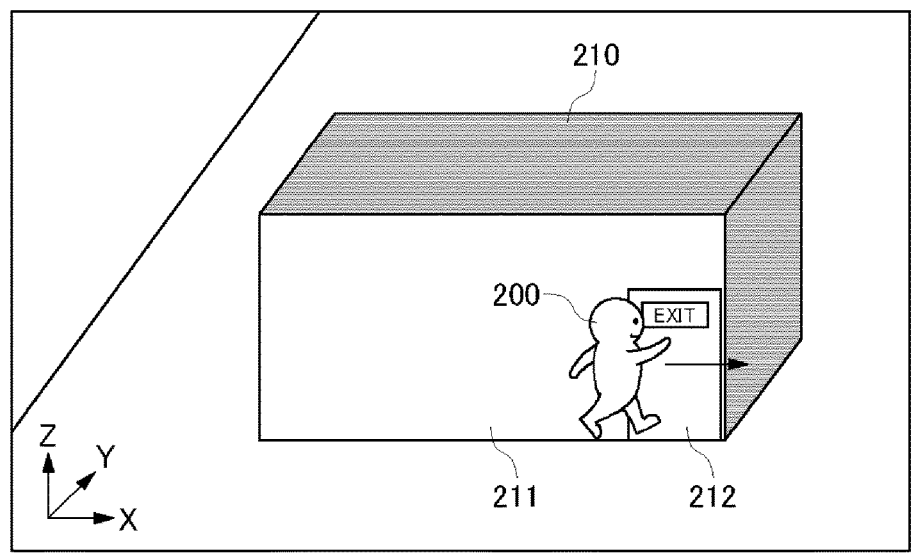
FIG. 15A is a diagram illustrating a situation where the character moves in a right direction in a predetermined surface, as an example.
Figure 15B:
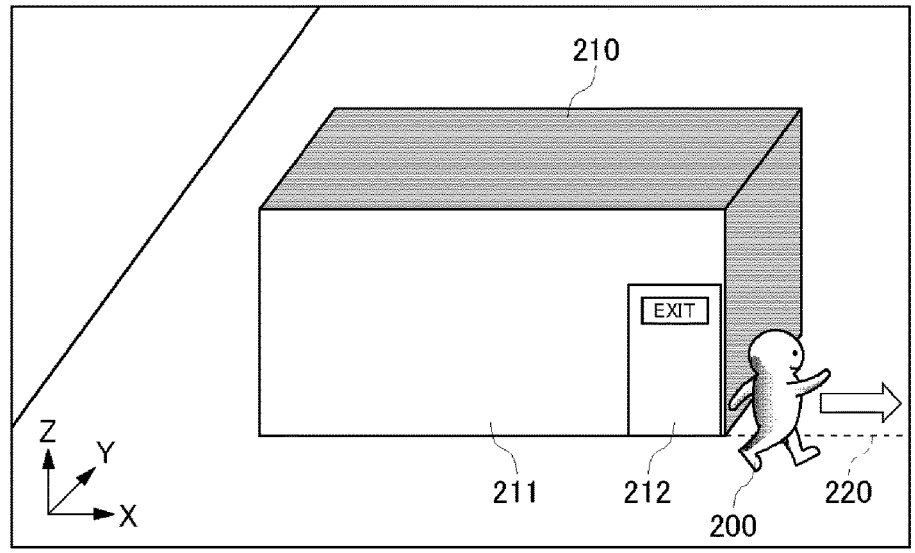
FIG. 15B is a diagram illustrating a situation of when the character exits the predetermined surface to the virtual three-dimensional space, as an example.

Next, the position where the character 200 is displayed when the character 200 exits from the predetermined surface 211 to the virtual three-dimensional space, will be described. As illustrated in FIG. 15A, when the character 200 moves in the right direction in the predetermined surface 211 provided in the wall surface of the building 210, and overlaps with the second determination area 212 with description of "EXIT", that is located in the right end, the character 200 exits to the front further than a line 220 of the predetermined surface 211 provided in the wall surface of the building 210 in the virtual three-dimensional space as illustrated in FIG. 15B. Thereby, it looks like the character 200 exits from an exit drawn in the predetermined surface 211, to the front.

Figure 16A:
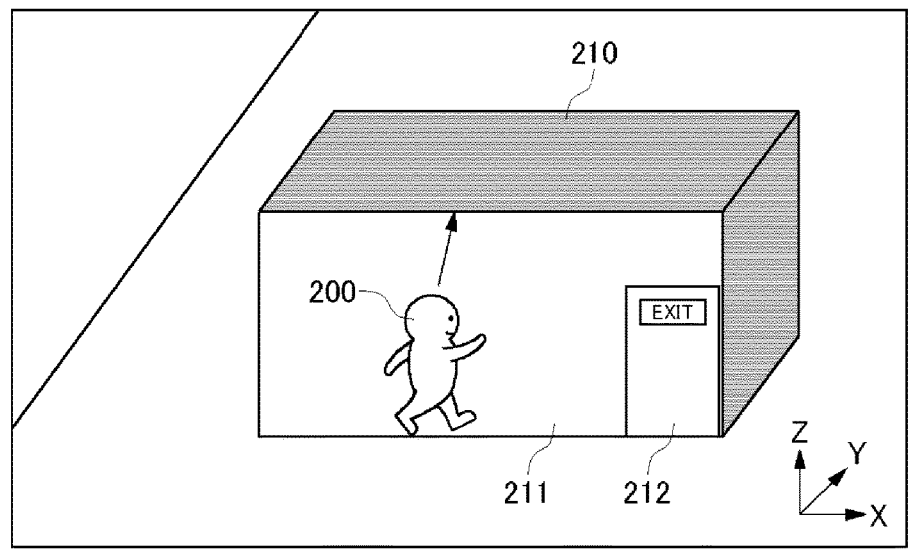
FIG. 16A is a diagram illustrating a situation where the character jumps in the predetermined surface, as an example.
Figure 16B:
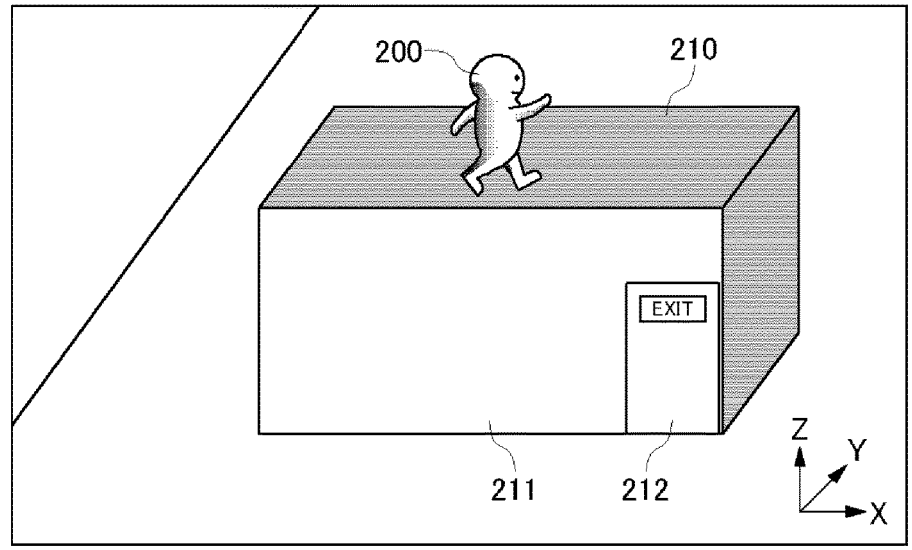
FIG. 16B is a diagram illustrating a situation of when the character exits the predetermined surface to the virtual three-dimensional space, as an example.

FIG. 16A and FIG. 16B are diagrams illustrating another example of exiting position adjustment. In this example, as illustrated in FIG. 16A, the character 200 jumps higher than the height of the building to exit from the predetermined surface 211 to the virtual three-dimensional space. FIG. 16B is a diagram illustrating the position in which the character 200 exits to the virtual three-dimensional space. In this example, the character 200 exits deeper than the predetermined surface 211 provided in the wall surface of the building 210, and lands on the rooftop of the building 210. The rooftop of the building 210 corresponds to the "ground" in Claims. In this way, the exiting position adjustment may be automatically determined depending on a situation, and may be determined in advance by a creator of the game.

Figure 17:
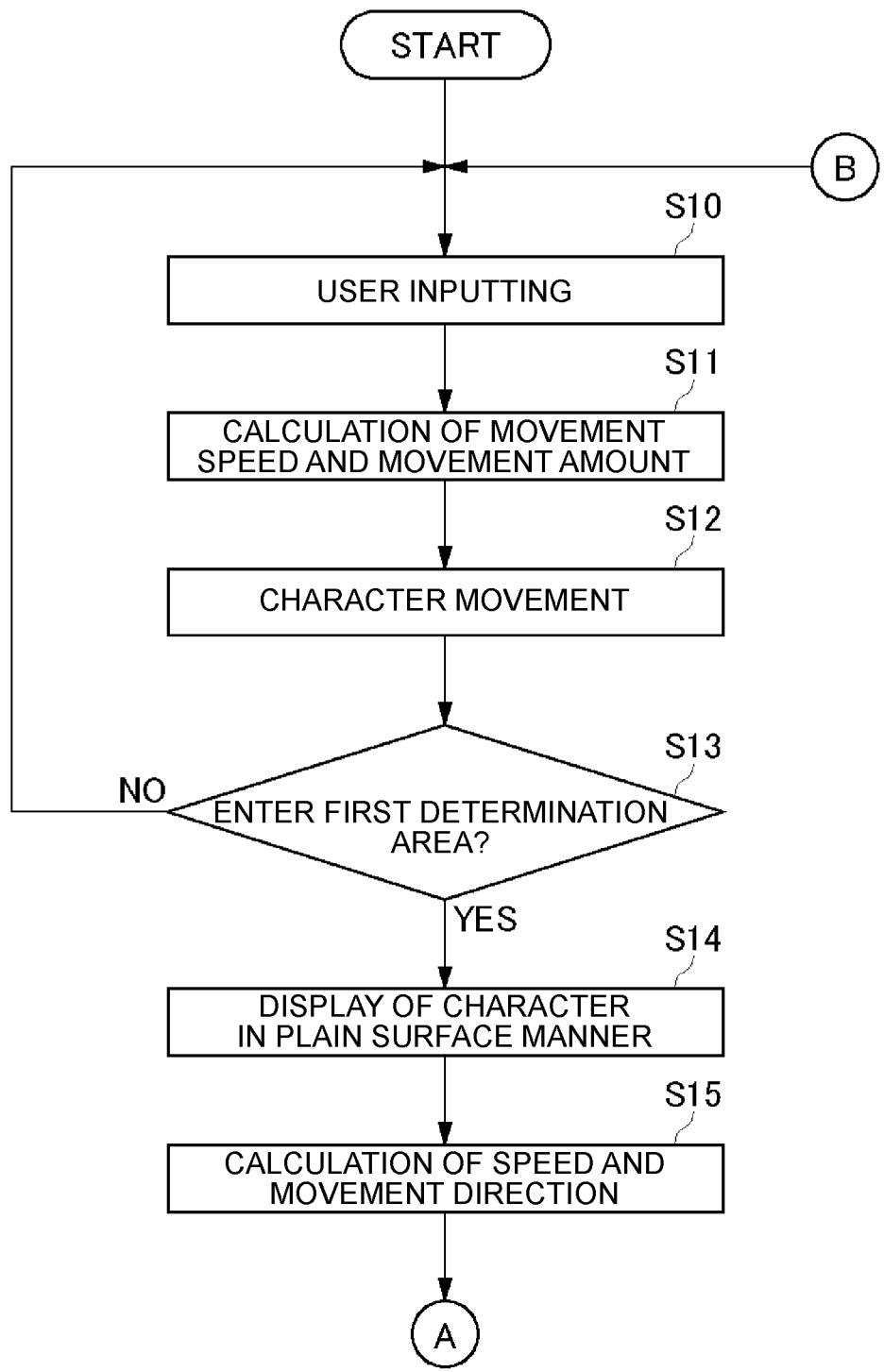
FIG. 17 is a flowchart illustrating operation of a game device main body of the present embodiment, as an example.
Figure 18:
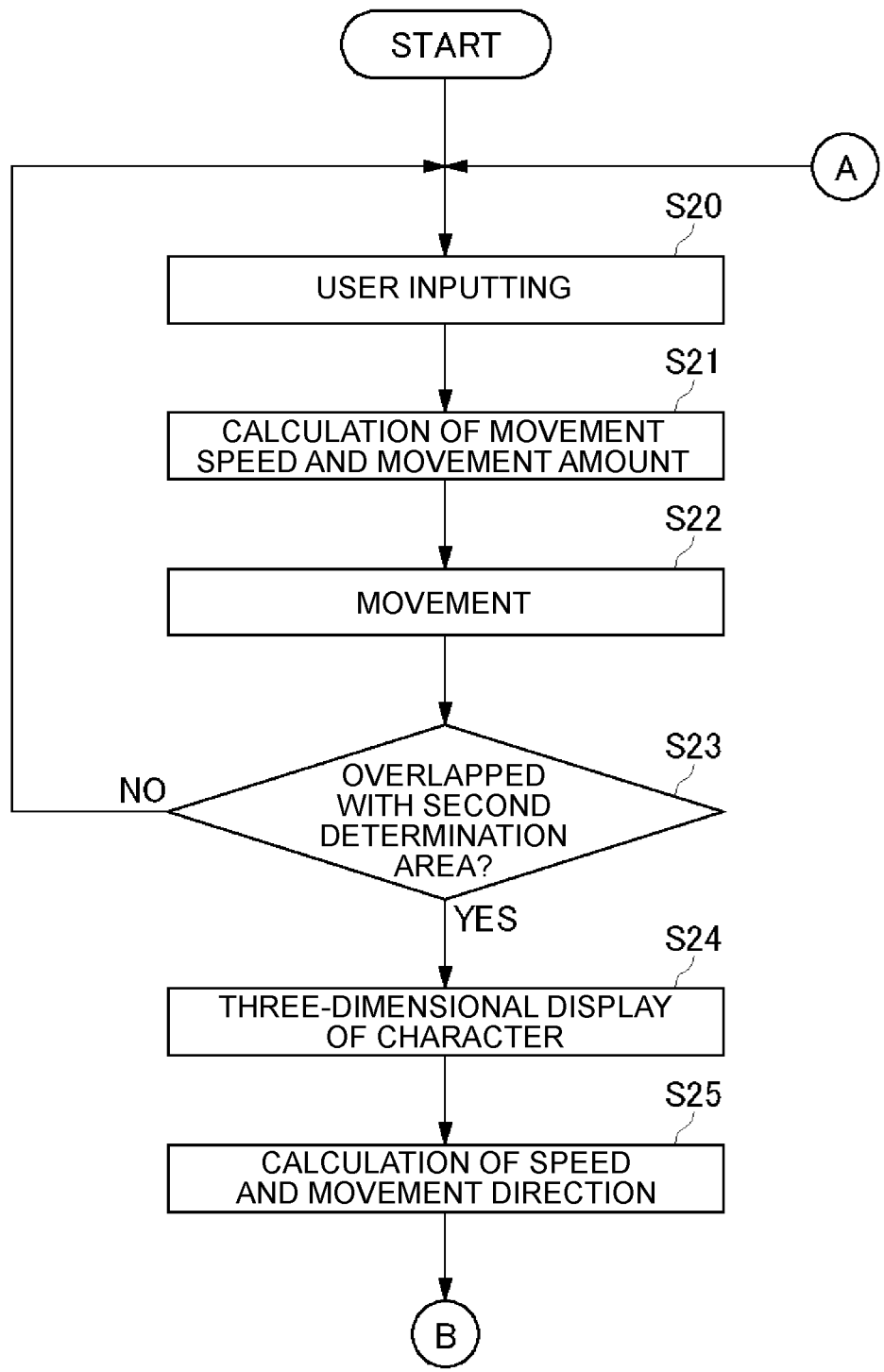
FIG. 18 is a flowchart illustrating operation of the game device main body of the present embodiment, as an example.

FIG. 17 and FIG. 18 are flowcharts illustrating movement control of the character 200 by the movement control unit 231. FIG. 17 illustrates movement of the character 200 in the virtual three-dimensional space, and operation of switching to the predetermined surface 211. FIG. 18 illustrates the movement of the character 200 in the predetermined surface 211, and operation of switching to the virtual three-dimensional space.

As illustrated in FIG. 17, if an input is performed by the user (S10) when the character 200 is in the virtual three-dimensional space, the movement control unit 231 calculates the movement speed and the movement amount of the character 200 on the basis of an input value from the user, and the current state (current position, movement speed, and direction) of the character 200 (S11). Subsequently, the movement control unit 231 moves the character 200 (S12), and determines whether the character 200 enters the first determination area 214 (S13). As a result of this determination, when it is not determined that the character 200 enters the first determination area 214 (NO at S13), the movement control unit 231 returns to step S10 of user inputting.

When it is determined that the character 200 has entered the first determination area 214 (YES at S13), the display mode control unit 233 causes the character 200 that has been displayed in three dimensions in the virtual three-dimensional space, to be displayed in a plain surface manner (S14). Thereby, it is considered that the character 200 has entered the predetermined surface 211. The movement control unit 231 calculates the speed and the movement direction of the character 200 that has entered the predetermined surface 211 (S15). As described above, the speed in the predetermined surface 211 is calculated so that the amount of the movement speed is maintained, on the basis of the movement speed in the virtual three-dimensional space immediately before the switching to the predetermined surface 211. The movement direction is calculated by restricting the movement in the normal direction of the predetermined surface 211. The operation of the movement control unit 231 proceeds to the flowchart illustrated in FIG. 18.

As illustrated in FIG. 18, if an input is performed by the user (S20) when the character 200 is in the predetermined surface 211, the movement control unit 231 calculates the movement speed and the movement amount of the character 200 on the basis of an input value from the user, and the current state (current position, movement speed, and direction) of the character 200 (S21). Subsequently, the movement control unit 231 moves the character 200 (S22), and determines whether the character 200 overlaps with the second determination area 212 (S23). As a result of this determination, when it is determined that the character 200 does not overlap with the second determination area 212 (NO at S23), the movement control unit 231 returns to step S20 of user inputting.

When it is determined that the character 200 has overlapped with the second determination area 212 (YES at S23), the display mode control unit 233 causes the character 200 that has been displayed in a plain surface manner in the predetermined surface 211, to be displayed in three dimensions (S24). Thereby, it is considered that the character 200 has exited the predetermined surface 211 to the virtual three-dimensional space. The movement control unit 231 calculates the speed and the movement direction of the character 200 that has entered the virtual three-dimensional space (S25). As described above, the speed in the virtual three-dimensional space is calculated so that the amount of the movement speed is maintained, on the basis of the movement speed in the predetermined surface 211 input by the user immediately before the switching to the virtual three-dimensional space. For the movement direction in this calculation, the movement direction in the predetermined surface 211 is used. The operation of the movement control unit 231 proceeds to the flowchart illustrated in FIG. 17.

The configuration and operation of the game device main body 2 and the game program of the embodiments have been described above.

In the game device main body 2 of the present embodiment, when the character 200 enters the predetermined surface 211 from the virtual three-dimensional space, the movement control unit 231 causes the character 200 to be displayed in a plain surface manner and be moved in a state of being restricted in the predetermined surface 211. Thus, the game in the virtual three-dimensional space and the game in the predetermined surface 211 can be enjoyed. When switching between the virtual three-dimensional space and the predetermined surface 211 is performed, relevance is imparted to the movement speeds of the character 200 before and after the switching. Thus, smooth switching by which the character 200 can smoothly move between the virtual three-dimensional space and the predetermined surface 211, can be realized.

The information processing device and the information processing program of the present technique have been described above in detail, with the embodiments. However, the information processing device and the information processing program of the present technique is not limited to the embodiments described above.

In the embodiments described above, an example in which the first determination area 214 is used has been described as a method of determining switching of the character 200 from the virtual three-dimensional space to the predetermined surface 211. However, collision to the predetermined surface 211 by the character 200 may be detected to switch the movement from the movement in the virtual three-dimensional space to the movement in the predetermined surface 211 in response to the collision.

In the embodiments described above, for the movement direction in the predetermined surface 211, an example has been described, in which the movement direction in the predetermined surface 211 is determined by excluding the component of the normal direction of the predetermined surface 211 (that is, the restriction direction in the predetermined surface 211) from the movement direction in the virtual three-dimensional space. In this method, the object that moves in the normal direction of the predetermined surface 211 to collide with the predetermined surface 211 does not have the initial movement direction when entering the predetermined surface 211. As a modification, the movement direction of when the object collides from the normal direction of the predetermined surface 211 may be determined in advance, may be determined with predetermined conditions, and may be determined randomly.

Figure 19:
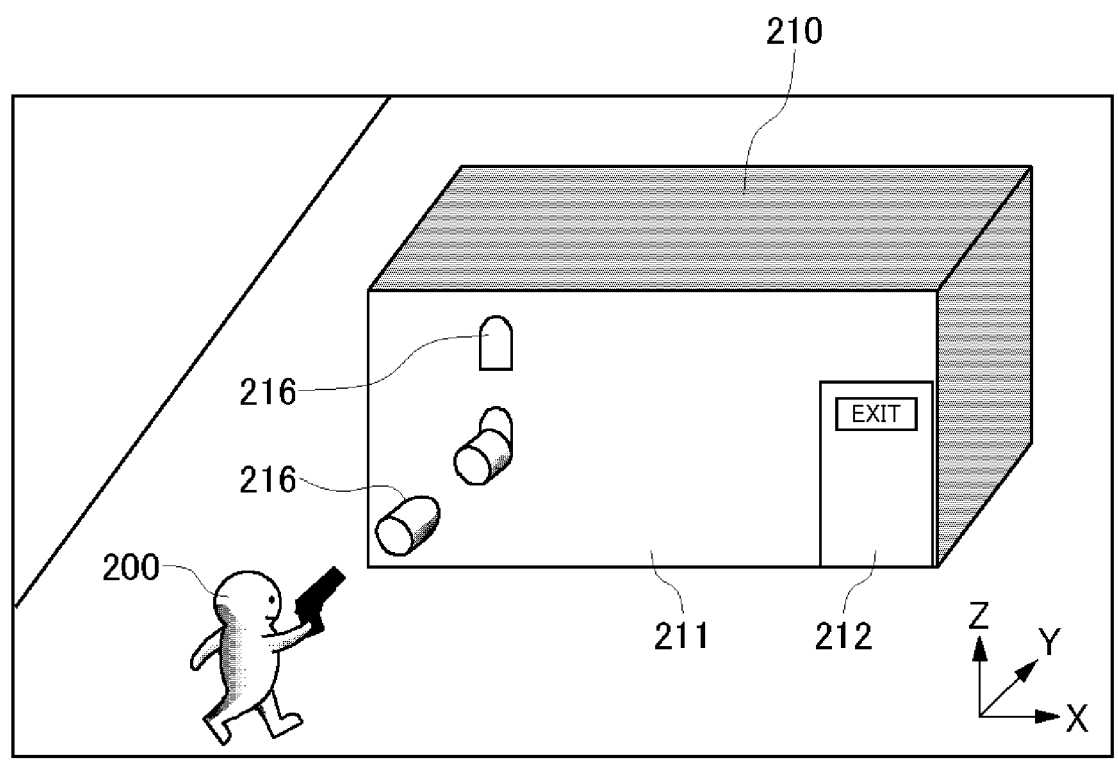
FIG. 19 is a diagram illustrating an example in which the character in the virtual three-dimensional space shoots a gun in perpendicular to the predetermined surface.

FIG. 19 is a diagram illustrating an example in which an upper direction is set as a default movement direction. In this example, when the character 200 that is in the virtual three-dimensional space shoots a bullet 216 in perpendicular to the predetermined surface 211, the object of the bullet that has collided with the predetermined surface 211 changes the direction to upward and moves, when entering the predetermined surface 211. At this time, for the speed of the bullet 216, the speed of the time of the three-dimensional movement is maintained even when the character 200 enters the predetermined surface.

Figure 20A:
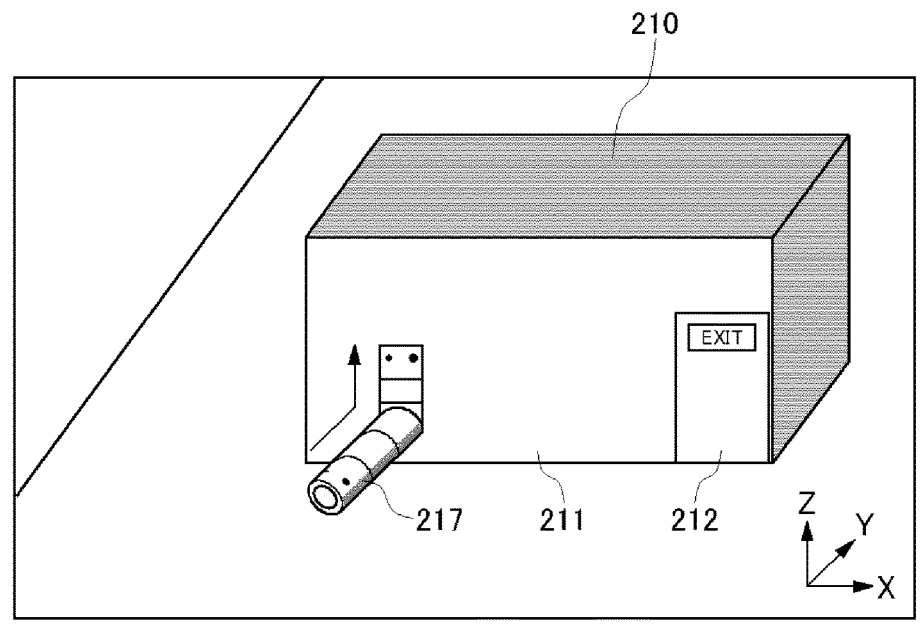
FIG. 20A is a diagram illustrating the character reciprocating between the virtual three-dimensional space and the predetermined surface, as an example.
Figure 20B:
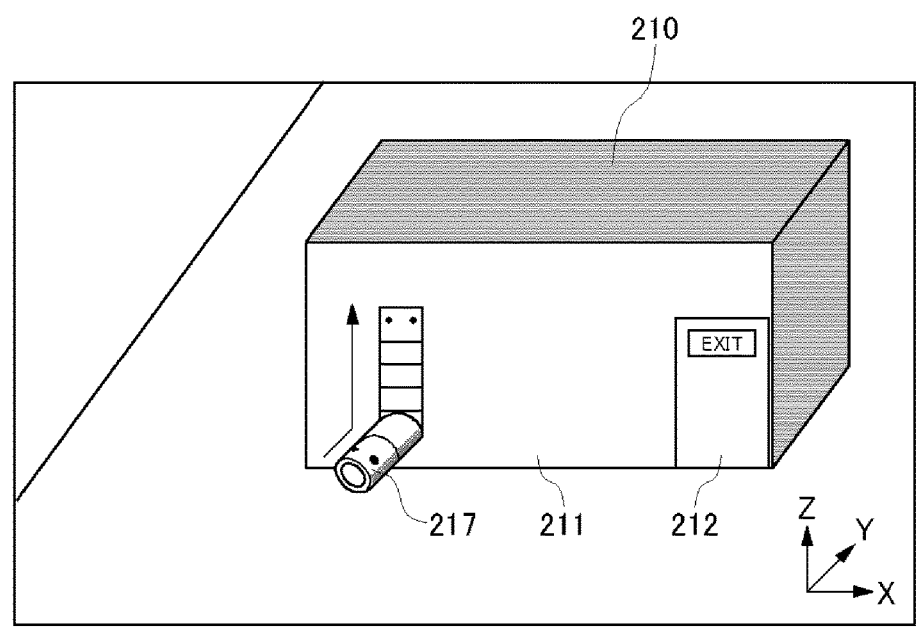
FIG. 20B is a diagram illustrating the character reciprocating between the virtual three-dimensional space and the predetermined surface, as an example.

FIG. 20A and FIG. 20B illustrate another example in which the upper direction is set as a default movement direction. In this example, an object 217 of a non-playing character, that is like a centipede having heads in front and back, reciprocates between the virtual three-dimensional space and the predetermined surface 211. FIG. 20A and FIG. 20B illustrate only an outward part. As illustrated in FIG. 20A, when the object 217 collides with the predetermined surface 211 from the normal direction, the object 217 enters the predetermined surface 211 to continue moving in the upper direction. When the object 217 continues traveling in the direction of the predetermined surface 211, as illustrated in FIG. 20B, the object 217 is absorbed gradually in the predetermined surface 211 and moves in the upper direction for that amount. After moving in the upper direction in the predetermined surface 211, the object changes the movement direction to the opposite direction, moves in a lower direction in the predetermined surface 211, and returns to the virtual three-dimensional space from the same position as a place where the object has entered the predetermined surface 211. The movement direction of the object in the virtual three-dimensional space is a direction away from the predetermined surface 211 in the normal direction of the predetermined surface 211, that is the opposite from the direction illustrated in FIG. 20A and FIG. 20B.

In the embodiments described above, adjustment of the position of the character 200 in accordance with the situation when the character 200 exits the predetermined surface 211 to the virtual three-dimensional space, has been described with reference to FIG. 15 and FIG. 16. However, in the game device main body 2 of the present technique, the movement control unit 231 may adjust not only the position of the character 200 but also the speed of the character 200. For example, in the example illustrated in FIG. 15, an initial speed heading from the predetermined surface 211 provided in the wall surface of the building 210 to the front may be imparted. In the example illustrated in FIG. 16, an initial speed heading from the predetermined surface 211 of the building 210 to the rooftop direction of the building 210 may be imparted.

In the embodiments described above, an example has been described, in which the character 200 is displayed in three dimensions in the virtual three-dimensional space, and is displayed in a plain surface manner in the predetermined surface 211. However, the display of the character in the predetermined surface may be performed with low resolution in an extent that pixels can be determined by an ordinary visual confirmation, that is, may be performed with a pixel art. The type of BGM and effect sound may be changed between when the character 200 is in the virtual three-dimensional space and when the character 200 is in the predetermined surface 211. For example, music having a heavy feeling is applied when the character 200 is in the virtual three-dimensional space, and light music or music having a feeling as if an old sound source chip is used, is applied when the character 200 is in the predetermined surface 211. Thereby, the user can actually feel whether being in the virtual three-dimensional space or in the predetermined surface 211 by the BGM, or the like.

In the embodiments described above, an example in which the predetermined surface is the wall surface of the building, has been described. However, the predetermined surface may be not only the wall surface but also, for example, the ground, a ceiling, and an inclined surface. In the embodiments described above, an example has been described, in which switching is performed between the movement in the virtual three-dimensional space and the movement in the predetermined surface by the movement of the character 200. However, the switching may be performed by pressing buttons 33 to 36, 53 to 56, or the like of the left controller 3 and the right controller 4. In the embodiments described above, an example has been described, in which, when the character 200 and the second determination area are overlapped with each other, the movement of the character 200 is switched from the predetermined surface 211 to the virtual three-dimensional space. However, "overlapping" with the second determination area 212 includes cases of "overlapping in a part", "overlapping in a default point of the object", and "overlapping entirely", and the creator of the game can determine which is adopted, in advance.

In the embodiments described above, an example has been described, in which, when the character 200 overlaps with the second determination area 212 with description of "EXIT", the movement is switched from the predetermined surface 211 to the virtual three-dimensional space. However, for example, the movement may be switched from the virtual three-dimensional space to the predetermined surface 211 when the character 200 overlaps with the first determination area with description of "ENTRANCE", or other areas in the periphery of the first determination area. In the embodiments described above, an example has been described, in which the second determination area 212 with description of "EXIT" is fixed. However, the second determination area 212 may move. In the embodiments described above, an example has been described, in which the movement range and the display mode of the same character 200 are changed. However, the object may be switched to another object when the switching is performed between the virtual three-dimensional space and the predetermined surface 211. The first determination area may change in a shape depending on a position of a virtual camera. For example, the first determination area may extend in a direction extending from the virtual camera to the first determination area.

The invention claimed is:

1. A non-transitory computer-readable storage medium having stored therein an information processing program for controlling movements of an object in a virtual three-dimensional space, the information processing program, when executed by at least one processor, causes the at least one processor to provide execution comprising:
controlling the movements of the object;
determining switching of the movement of the object between a three-dimensional movement in the virtual three-dimensional space and a movement along a plain surface provided in the virtual three-dimensional space; and
determining a speed of the object after the switching on the basis of a speed of the object before the switching when the switching between the three-dimensional movement in the virtual three-dimensional space and the movement along the plain surface is performed, wherein
when the object switches from the movement along the plain surface to the three-dimensional movement, the speed component along the plain surface before the switching is used as the speed component with respect to the plain surface of the three-dimensional movement after the switching, and when the object moves along the plain surface, the object is displayed in a plain surface manner causing the object to be absorbed to the plain surface.

2. The non-transitory computer-readable storage medium according to claim 1, wherein the plain surface includes a first axis and a second axis representing a first surface and a third axis representing a first direction.

3. The non-transitory computer-readable storage medium according to claim 2, wherein the first surface is a horizontal surface and the first direction is a vertical direction.

4. The non-transitory computer-readable storage medium according to claim 1, wherein movement of the object is controlled based on the determined speed.

5. The non-transitory computer-readable storage medium according to claim 4, wherein when switching to the movement along the plain surface, a speed component is decomposed from a virtual speed vector of the object, and the object moves along the plain surface using the speed component.

6. The non-transitory computer-readable storage medium according to claim 1, wherein the information processing program further causes the at least one processor to provide execution comprising:
when the switching is performed from the three-dimensional movement to the movement along the plain surface, determining as a speed of the movement along the plain surface, the speed component obtained by removing a speed component of a normal direction in a position of the object along the plain surface, from a speed component of the object of the three-dimensional movement before the switching.

7. The non-transitory computer-readable storage medium according to claim 1, wherein the information processing program further causes the at least one processor to provide execution comprising:
controlling a display mode of the object; and
displaying the object that moves in three dimensions, in three dimensions, and displaying the object that moves along the plain surface in the plain surface manner or a curved surface manner.

8. The non-transitory computer-readable storage medium according to claim 1, wherein the information processing program further causes the at least one processor to provide execution comprising:
controlling a display mode of the object; and
displaying the object by switching between a first object that moves in three dimensions, and a second object that moves along the plain surface.

9. The non-transitory computer-readable storage medium according to claim 1, wherein
a first determination area is provided in the virtual three-dimensional space, and the first determination area includes a space extending in a normal direction of the plain surface, and
switching from the three-dimensional movement to the movement along the plain surface is determined in response to entering of the object that moves in the virtual three-dimensional space, to the first determination area.

10. The non-transitory computer-readable storage medium according to claim 1, wherein switching from the three-dimensional movement to the movement along the plain surface is determined in response to contact of the object that moves in the virtual three-dimensional space with the plain surface in the virtual three-dimensional space.

11. The non-transitory computer-readable storage medium according to claim 1, wherein switching from the movement along the plain surface to the three-dimensional movement is determined depending on whether the object that moves in the plain surface overlaps with a second determination area.

12. The non-transitory computer-readable storage medium according to claim 11, wherein the second determination area is identifiable from other portions, and moves along the plain surface.

13. The non-transitory computer-readable storage medium according to claim 1, wherein the information processing program further causes the at least one processor to provide execution comprising, when switching is performed from the movement along the plain surface to the three-dimensional movement, performing at least any one of (1) setting an initial position of the object to be a position moved for a predetermined amount in a normal direction in the position of the object along the plain surface, and (2) imparting to the object with a speed in the normal direction.

14. The non-transitory computer-readable storage medium according to claim 1, wherein the information processing program further causes the at least one processor to provide execution comprising, when switching is performed from the movement along the plain surface to the three-dimensional movement, performing at least any one of (1) setting an initial position of the object to be a position moved for a predetermined amount in a direction in which the closest ground exists in the virtual space, and (2) imparting to the object with a speed in the direction in which the ground exists.

15. The non-transitory computer-readable storage medium according to claim 1, wherein the information processing program further causes the at least one processor to provide execution comprising, when the object that moves in three dimensions in the normal direction of the plain surface in the virtual three-dimensional space is switched to the movement along the plain surface, setting a direction perpendicular to the normal direction as the initial movement direction.

16. An information processing system configured to control movements of an object in a virtual three-dimensional space, the information processing system comprising:
   a processor; and
   a memory configured to store computer readable instructions that, when executed by the processor, cause the information processing system to:
   control the movements of the object;
   determine switching of the movement of the object between a three-dimensional movement in the virtual three-dimensional space and a movement along a plain surface provided in the virtual three-dimensional space; and
   determine a speed of the object after the switching on the basis of a speed of the object before the switching when the switching between the three-dimensional movement in the virtual three-dimensional space and the movement along the plain surface is performed, wherein
   when the object switches from the movement along the plain surface to the three-dimensional movement, the speed component along the plain surface before the switching is used as the speed component with respect to the plain surface of the three-dimensional movement after the switching, and
   when the object moves along the plain surface, the object is displayed in a plain surface manner causing the object to be absorbed to the plain surface.

17. An information processing method for controlling movements of an object in a virtual three-dimensional space, the information processing method comprising:
   controlling the movements of the object;
   determining switching of the movement of the object between a three-dimensional movement in the virtual three-dimensional space and a movement along a plain surface provided in the virtual three-dimensional space; and
   determining a speed of the object after the switching on the basis of a speed of the object before the switching when the switching between the three-dimensional movement in the virtual three-dimensional space and the movement along the plain surface is performed, wherein
   when the object switches from the movement along the plain surface to the three-dimensional movement, the speed component along the plain surface before the switching is used as the speed component with respect to the plain surface of the three-dimensional movement after the switching, and
   when the object moves along the plain surface, the object is displayed in a plain surface manner causing the object to be absorbed to the plain surface.

* * * * *